US007845011B2

(12) United States Patent
Hirai

(10) Patent No.: US 7,845,011 B2
(45) Date of Patent: Nov. 30, 2010

(54) DATA TRANSFER SYSTEM AND DATA TRANSFER METHOD

(75) Inventor: Tatsuya Hirai, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1326 days.

(21) Appl. No.: 11/250,974

(22) Filed: Oct. 14, 2005

(65) Prior Publication Data

US 2006/0085354 A1    Apr. 20, 2006

(30) Foreign Application Priority Data

Oct. 15, 2004    (JP)    ............................. 2004-302015

(51) Int. Cl.
*G06F 7/04*    (2006.01)
(52) U.S. Cl. .................. 726/26; 380/201; 380/277; 726/28; 713/155
(58) Field of Classification Search ................ 713/156, 713/155, 158, 175; 380/201, 203, 230, 270, 380/277; 726/26, 28; 705/55
See application file for complete search history.

(56) References Cited

U.S. PATENT DOCUMENTS 6,898,708 B2 *    5/2005    Hori et al. .................. 713/171

2002/0080973 A1 *    6/2002    Cromer et al. .............. 380/282
2002/0183985 A1 *    12/2002    Hori et al. ...................... 703/1

FOREIGN PATENT DOCUMENTS

WO    WO 01/13358 A1    2/2001
WO    WO 01/43339 A1    6/2001

* cited by examiner

*Primary Examiner*—Kimyen Vu
*Assistant Examiner*—April Y Shan
(74) *Attorney, Agent, or Firm*—Townsend and Townsend and Crew LLP; Darren Gold

(57) ABSTRACT

A transfer source gives a challenge key, own public key, an ID for identifying the target data, and an encryption key type to a transfer destination that is authenticated by a certificate. In accordance with the given key type, the transfer destination generates a first session key (and a second session key), encrypts the first session key and own public key (or second session key) with the transfer source's public key, encrypts the resulting encrypted data with the challenge key, and transmits the data encrypted with the challenge key to the transfer source. The transfer source encrypts the target data with the second session key (or the transfer destination's public key) that is derived from the received data, encrypts the resulting encrypted data with the first session key, and transmits the data encrypted with the first session key to the transfer destination. The transfer destination decrypts the received data with the first session key, and decrypts the resulting decrypted data with the second session key (or the own public key) to acquire the license.

12 Claims, 22 Drawing Sheets

Fig. 2

| Symbol | Name | Attribute | Characteristics |
|---|---|---|---|
| A\|\|B | Data joining | - | Joins data A and B. |
| E(X,Y) | Encryption | - | Encrypts data Y with data X. |
| D(X,Y) | Decryption | - | Decrypts data X with data Y. |
| {X}Y | Decryptable/verifiable data | - | Data X that can be decrypted and verified with data Y. |
| [S] | Transfer source generation/retention | - | Data originally retained/generated by a license transfer source. Used as a suffix. |
| [D] | Transfer destination generation/retention | - | Data originally retained/generated by a license transfer destination. Used as a suffix. |
| CRL | Certificate invalidation list | - | Retained/updated in a transfer module. A list of certificates that are invalidated by a certification authority. |
| CRL.D | Certificate invalidation list issue date/time | - | (Described within a certificate invalidation list) Issue date/time information about a certificate invalidation list. |
| KPCA | Certification authority public key | Public key | Embedded in a transfer module. Public key issued by a certification authority. Used for decrypting a certificate's electronic signature. |
| KCA | Certification authority secret key | Secret key | Embedded in a transfer module. Used for encrypting a certificate's electronic signature. |
| KPdc | Device class public key | Public key | Embedded in a transfer module. The certificate containing this key indicates that the apparatus in which the key is embedded is valid. |
| Kdc | Device class secret key | Secret key | Embedded in a transfer module. Used to decrypt data that is encrypted with KPdc. |
| KPd | Device public key | Public key | Embedded in a transfer module. This public key is uniquely embedded in each device. |
| Kd | Device secret key | Secret key | Embedded in a transfer module. Used to decrypt data that is encrypted with secret key KPd, which is uniquely embedded in each device. |
| Kch | Challenge key | Common key | Dynamically generated in a transfer module (transfer source). Challenge key. A temporary symmetric cipher key generated at a license transfer source. Used to |
| Ksn | Session (invariable/time-variant) key | Common key | Dynamically generated in a transfer module (transfer destination). Session key. A temporary symmetric cipher key generated at a license transfer destination. |
| Kso | Session shell key | Common key | Dynamically generated in a transfer module (transfer source). Session shell key. A temporary symmetric cipher key for use in encrypting a license that is already encrypted |
| Kc | Content key | Common key | Created at an encrypted content generation source. Used to encrypt/decrypt content data. |

Key to

DATA TRANSFER SYSTEM AND DATA TRANSFER METHOD

CROSS-REFERENCES TO RELATED APPLICATIONS

This application claims priority from Japanese Patent Application No. JP2004-302015, filed Oct. 15, 2004, the entire disclosure of which is incorporated herein by reference.

BACKGROUND OF THE INVENTION

The present invention relates to a system and method for transferring data between apparatuses or between modules, and more particularly to a data transfer system and method for encrypting data for copyright protection and transmitting it together with use condition data and other relevant information.

In recent years, the Internet and other information communication networks and the apparatuses for using such networks have rapidly made progress. Under these circumstances, data is digitized, transmitted/received, and recorded on media. Advantageously, digital data recorded on a medium can be readily duplicated without degrading its quality. Meanwhile, the rights of copyright holders of music data, image data, and other copyrighted data can be significantly violated unless they are properly protected. However, if top priority is given to copyright protection so that digital data distribution is obstructed, the profits of copyright holders are diminished although they can collect copyright fees at the time when their copyrighted products are duplicated.

Copyrighted data is distributed mainly through a digital communication network or broadcast wave. In a majority of cases where general users use such data, they record data in a storage device, which comprises, for instance, a semiconductor memory, mount the storage device in a player, and play back the stored data. In some cases, the storage device is built in a recorder/player. For the sake of convenience, however, it is highly probable that a portable storage device will be frequently used. One example of a portable storage device having a copyright protection function is a memory card that is described in Non-Patent Document 1 (http://panasonic.jp/sd/whats_sd/index.html).

As a data player, a recorder/player for use in receiving the above distributed data or a dedicated portable player is used. To protect the rights of copyright holders in such an instance, it is necessary to incorporate a security feature in the recorder/player and storage device so that the data recorded in the storage device cannot be played back beyond the limits defined by the copyright holders. More specifically, it is necessary to perform an authentication process, encryption process, and other appropriate processes on data transfers that are made in an internally or externally accessible region of the associated apparatuses.

Proposals made in Patent Documents 1 (Pamphlet WO01/013358) and 2 (Pamphlet WO01/043339) provide copyright protection by encrypting the digital data for use, defining a key for decrypting the data, and establishing the conditions for using the decrypted data in such a manner as to avoid illegal data acquisition, data falsification, and the like.

BRIEF SUMMARY OF THE INVENTION

There are the following problems with the conventional technology described above:

1) In a situation where a decryption key and use-condition-related information are transferred between apparatuses, the apparatus at the destination does not have an authentication function that determines whether the apparatus at the source is valid. Therefore, the apparatus at the destination records the decryption key and use-condition-related information received from an invalid apparatus. As a result, illegal access cannot be avoided.

2) If data is frequently transferred, the data playback may be delayed. The reason is that a heavy-duty cryptographic computation and certificate verification process needs to be performed in both the apparatuses at the source and destination whenever data is transferred.

3) When the validity of an apparatus is to be verified with a certificate, it is necessary that the entire system use such a certificate and a list of invalid certificates. However, only the certificate invalidation list for destination apparatuses can be updated.

The present invention provides a data transfer system and method that are free of the above problems. As a result of a careful study of the above problems, the inventor of the present invention has devised a data transfer method for transferring encrypted content data, key data for decrypting the content data, and decryption permission conditions (which constitute a "license") from one module to another as described below.

First Method

First of all, the transfer destination transmits a certificate, which includes the transfer destination's device class public key, to the transfer source. The transfer source checks whether the received certificate is valid. If the validity of the received certificate is verified, the transfer source generates a challenge key for temporary common key encryption, encrypts the challenge key with the received device class public key, joins a certificate, which includes the transfer source's own device class public key, to the generated encrypted data, and transmits the resulting joined data to the transfer destination. The transfer destination acquires the challenge key by decrypting the received data with the transfer destination's own device class secret key.

Next, the transfer source joins a license ID for identifying the license to a license encryption key (which is referred to as the "key type"), and transmits the resulting combination. In accordance with the received key type, the transfer destination generates a first session key and second session key or the first session key only. The key type information for all licenses is written in a single field. Then, in accordance with the key type, the transfer destination joins the first session key to the device public key possessed by the transfer destination or the second session key, and encrypts the resulting joined data with the received device class public key. After joining either of the two encrypted data to the transfer destination's own certificate invalidation list, the transfer destination encrypts the resulting joined data with the challenge key and transmits the resulting encrypted data to the transfer source.

The transfer source receives the data transmitted from the transfer destination, decrypts the received data with the challenge key, and uses its own device class secret key to decrypt the decrypted data excluding the transfer destination's certificate invalidation list. Upon decryption, the transfer source acquires the joined data that comprises the first session key and second session key or the first session key and device public key. The second session key or device public key acquired in this manner is then used to encrypt the license. The transfer source joins the resulting encrypted data to its own certificate invalidation list, encrypts the resulting joined data with the first session key, and transmits the resulting encrypted data to the transfer destination. Before joining the transfer source's own certificate invalidation list to the above encrypted data, the transfer source compares the issue date/time of the received certificate invalidation list against that of its own certificate invalidation list. If the issue date/time of its own certificate invalidation list is earlier than the other, the transfer source overwrites its own certificate invalidation list with the received one, and does not perform the above data joining procedure or transmit the certificate invalidation list to the transfer destination.

The transfer destination decrypts the received encrypted data respectively with corresponding keys, and records the acquired license in its tamperproof area (the area that does not permit an illegal rewrite).

If the license is to be transferred in a situation where the first session key was once shared by the transfer source and destination and is retained between them, the transfer destination generates a new session key, encrypts the generated new session key with the first session key, and transmits the resulting encrypted data to the transfer source. The transfer source decrypts the received data with the first session key to acquire the new session key, uses the acquired key to encrypt the license to be transferred, encrypts the encrypted license with the first session key, and transmits the resulting encrypted license to the transfer destination.

Second Method

An alternative data transfer method will now be described. When a license is to be encrypted and transferred from one module to another as is the case with the first method, the transfer destination begins by transmitting a certificate, which includes the transfer destination's device class public key, to the transfer source.

The transfer source checks whether the received certificate is valid. If the validity of the received certificate is verified, the transfer source generates a challenge key for temporary common key encryption, encrypts the challenge key with the received device class public key, joins a certificate, which includes the transfer source's own device class public key, to the generated encrypted data, and transmits the resulting joined data to the transfer destination. Further, the transfer source transmits a license ID for identifying the license to the transfer destination.

The transfer destination decrypts the encrypted data of the above received certificate with its own device class secret key to acquire the challenge key. The transfer destination generates a first session key, joins the generated first session key to the transfer destination's own device public key, encrypts the resulting joined data with the received device class public key, joins a certificate invalidation list to the resulting encrypted data, encrypts the resulting joined data with the challenge key, and transmits the resulting encrypted data to the transfer source.

The transfer source first decrypts the received encrypted data with the challenge key, and then decrypts the decrypted data excluding the transfer destination's certificate invalidation list with the transfer source's own device class secret key to acquire the first session key and device public key, which are joined together. After encrypting the license with the acquired first session key, the transfer source joins its own certificate invalidation list to the resulting encrypted data, generates a session shell key, which is a new temporary key, and uses the generated session shell key to encrypt the encrypted data that is obtained by joining the license to the certificate invalidation list. The transfer source also encrypts the generated session shell key with the acquired device public key. The transfer source then joins the two encrypted data that have been obtained as described above, and transmits the resulting joined data to the transfer destination. Before joining the transfer source's own certificate invalidation list to the data, the transfer source compares the issue date/time of the received certificate invalidation list against that of the transfer source's own certificate invalidation list. If the issue date/time of its own certificate invalidation list is later than the other, the transfer source overwrites its own certificate invalidation list with the received one, and does not perform the above data joining procedure or transmit the certificate invalidation list to the transfer destination.

The transfer destination decrypts the received joined data respectively with corresponding keys, and records the acquired license in its tamperproof area.

If the license is to be transferred in a situation where the first session key was once shared by the transfer source and destination and is retained between them, the transfer destination generates a new session key, encrypts the generated new session key with the session shell key, and transmits the resulting encrypted data to the transfer source. The transfer source decrypts the received encrypted data with the session shell key to acquire the new session key, uses the acquired key to encrypt the license to be transferred, encrypts the encrypted license with the session shell key, and transmits the resulting encrypted license to the transfer destination.

As a means for embodying the above technical idea, there is provided a method for encrypting and transferring a license that comprises content data, key data for decrypting the content data, and decryption permission condition data for the content data. The method comprises the steps of: causing a transfer destination to transmit to a transfer source a certificate including a transfer destination's own public key; causing the transfer source to verify the validity of the received certificate, generate a challenge key, encrypt the challenge key with the transfer destination's public key included in said certificate, transmit first data to the transfer destination, said first data being formed by joining a certificate including a transfer source's own public key to the resulting encrypted data, and transmit second data to the transfer destination, said second data being formed by joining a license ID for identifying the license to key type data used for indicating the type of a license encryption key; causing the transfer destination to decrypt said first data excluding the transfer source's public key with the transfer destination's own secret key to acquire the challenge key after acquiring the transfer source's public key from said first data, generate a first session key and a second session key or only the first session key in accordance with the key type data included in said second data, join the first session key to the transfer destination's own public key or join the first session key to the second session key, encrypt the joined data with said transfer source's own public key, encrypt the resulting encrypted data with said challenge key, and transmit the data encrypted with said challenge key to the transfer source; causing the transfer source to decrypt the received encrypted data with said challenge key, decrypt the resulting decrypted data with a transfer source's own secret key, acquire the first session key and the second session key or the first session key and the transfer destination's public key from the data decrypted with the transfer source's own secret key, encrypt the license with the acquired second session key or the transfer destination's public key, encrypt the license-encrypted data with said first session key, and transmit the data encrypted with said first session key to the transfer destination; and causing the transfer destination to decrypt the received encrypted data with said first session key, and acquire the license by decrypting the resulting decrypted data with said second session key or the transfer source's own public key.

The present invention also provides a method for encrypting and transferring a license that comprises content data, key data for decrypting the content data, and decryption permission condition data for the content data. The method comprises the steps of: causing a transfer destination to transmit to a transfer source a certificate including a transfer destination's own public key; causing the transfer source to verify the validity of the received certificate, generate a challenge key, encrypt the challenge key with the transfer destination's public key included in said certificate, transmit first data to the transfer destination, said first data being formed by joining a certificate including a transfer source's own public key to the resulting encrypted data, and transmit second data to the transfer destination, said second data being formed by joining a license ID for identifying the license to key type data used for indicating the type of a license encryption key; causing the transfer destination to decrypt said first data excluding the transfer source's public key with the transfer destination's own secret key to acquire the challenge key after acquiring the transfer source's public key from said first data, generate a first session key and a second session key or only the first session key in accordance with the key type data included in said second data, join the first session key to the transfer destination's own public key or join the first session key to the second session key, encrypt the joined data with said transfer source's own public key, join the data encrypted with said transfer source's own public key to a transfer destination's own certificate invalidation list, encrypt the resulting joined data with said challenge key, and transmit the data encrypted with said challenge key to the transfer source; causing the transfer source to decrypt the received encrypted data with said challenge key, compare the transfer destination's certificate invalidation list included in the resulting decrypted data against a transfer source's own certificate invalidation list, handle the transfer destination's certificate invalidation list as the transfer source's own certificate invalidation list if the transfer destination's certificate invalidation list is newer than the transfer source's own certificate invalidation list, decrypt said decrypted data excluding the transfer destination's certificate invalidation list with a transfer source's own secret key, acquire the first session key and the second session key or the first session key and the transfer destination's public key from the data decrypted with the secret key, encrypt the license with the acquired second session key or the transfer destination's public key, join the license-encrypted data to the transfer source's own certificate invalidation list, encrypt the resulting joined data with said first session key, and transmit the data encrypted with said first session key to the transfer destination; and causing the transfer destination to acquire the transfer source's certificate invalidation list by decrypting the received encrypted data with said first session key, and acquire the license by decrypting said decrypted data excluding the transfer source's certificate invalidation list with said second session key or the transfer destination's own public key.

In the method according to the present invention, when said license is to be encrypted and transferred while the first session key common to the transfer source and the transfer destination is retained, the method comprises the steps of: causing the transfer destination to generate a new session key, encrypt the session key with said first session key, and transmit the resulting encrypted data to the transfer source; and causing the transfer source to acquire said new session key by decrypting the received encrypted data with said first session key, encrypt the license with the acquired new session key, encrypt the license-encrypted data with said first session key, and transmit the data encrypted with said first session key to the transfer destination.

The present invention also provides a method for encrypting and transferring a license that comprises content data, key data for decrypting the content data, and decryption permission condition data for the content data. The method comprises the steps of: causing a transfer destination to transmit to a transfer source a certificate including a transfer destination's own public key; causing the transfer source to verify the validity of the received certificate, generate a challenge key, encrypt the challenge key with the transfer destination's public key included in said certificate, join a certificate including the transfer source's own public key to the resulting encrypted data, and transmit the resulting joined data to the transfer destination; causing the transfer destination to acquire the transfer source's public key from the received data, acquire the challenge key by decrypting the received data excluding the transfer source's public key with a transfer destination's own secret key, and transmit a license ID for identifying the license to the transfer source; causing the transfer destination to generate a session key, join the generated session key to the transfer destination's public key, encrypt the resulting joined data with the transfer source's public key, encrypt the encrypted data with the challenge key, and transmit the data encrypted with the challenge key to the transfer source; causing the transfer source to decrypt the received encrypted data with the challenge key, decrypt the resulting decrypted data with a transfer source's own secret key, acquire the session key and the transfer destination's public key from the decrypted data, encrypt the license with the acquired session key, encrypt the license-encrypted data with a newly generated session shell key, encrypt said session shell key with the transfer destination's public key, join said two pieces of encrypted data, and transmit the joined data to the transfer destination; and causing the transfer destination to receive the transmitted data, which includes the data encrypted by the transfer destination's own public key and the data encrypted by said session shell key, acquire said session shell key by decrypting the data encrypted by the transfer destination's own public key with the transfer destination's own secret key, decrypt the data encrypted by said session shell key with said session shell key, and acquire the license by decrypting the resulting decrypted data with said session key.

The present invention also provides a method for encrypting and transferring a license that comprises content data, key data for decrypting the content data, and decryption permission condition data for the content data. The method comprises the steps of: causing a transfer destination to transmit to a transfer source a certificate including a transfer destination's own public key; causing the transfer source to verify the validity of the received certificate, generate a challenge key, encrypt the challenge key with the transfer destination's public key included in said certificate, join a certificate including the transfer source's own public key to the resulting encrypted data, and transmit the resulting joined data to the transfer destination; causing the transfer destination to acquire the transfer source's public key from the received data, acquire the challenge key by decrypting the received data excluding the transfer source's public key with a transfer destination's own secret key, and transmit a license ID for identifying the license to the transfer source; causing the transfer destination to generate a session key, join the generated session key to the transfer destination's public key, encrypt the resulting joined data with the transfer source's public key, join the resulting encrypted data to a transfer destination's own certificate invalidation list, encrypt the thus-obtained joined data with the challenge key, and transmit the data encrypted with the challenge key to the transfer source; causing the transfer source to decrypt the received encrypted data with the challenge key, compare the transfer destination's certificate invalidation list included in the resulting decrypted data against a transfer source's own certificate invalidation list, handle the transfer destination's certificate invalidation list as the transfer source's own certificate invalidation list if the transfer destination's certificate invalidation list is newer than the transfer source's own certificate invalidation list, decrypt said decrypted data excluding the transfer destination's certificate invalidation list with a transfer source's own secret key, acquire a session key and the transfer destination's public key from the resulting decrypted data, encrypt the license with the acquired session key, join the license-encrypted data to the transfer source's own certificate invalidation list, encrypt the resulting joined data with a newly generated session shell key, encrypt said session shell key with the transfer destination's public key, join said two pieces of encrypted data, and transmit the joined data to the transfer destination; and causing the transfer destination to receive the transmitted data, which includes the data encrypted by the transfer destination's own public key and the data encrypted by said session shell key, acquire said session shell key by decrypting the data encrypted by the transfer destination's own public key with the transfer destination's own secret key, decrypt the data encrypted by said session shell key with said session shell key, acquire the transfer source's certificate invalidation list from the decrypted data, and acquire the license by decrypting said decrypted data excluding the transfer source's certificate invalidation list with said second session key.

In the method according to the present invention, when said license is to be encrypted and transferred while a session shell key common to the transfer source and the transfer destination is retained, the method comprises the steps of: causing the transfer destination to generate a new session key, encrypt the session key with said session shell key, and transmit the resulting encrypted data to the transfer source; and causing the transfer source to acquire said new session key by decrypting the received encrypted data with said session shell key, encrypt the license with the acquired new session key, encrypt the license-encrypted data with said session shell key, and transmit the data encrypted with said session shell key to the transfer destination.

The present invention also provides a system for transferring content data, key data for decrypting the content data, and decryption permission condition data for the content data between recording media by using any of the transfer methods described above.

The present invention also provides a system for transferring content data, key data for decrypting the content data, and decryption permission condition data for the content data between network nodes by using any of the transfer methods described above.

As described above, the data transfer system and method according to the present invention permits a destination apparatus receiving a data decryption key or data use condition information from an invalid apparatus to reject such received data. Therefore, when a source apparatus successively transmits keys for decrypting a plurality of data and data use condition information to a destination apparatus, the cryptographic computation loads on both apparatuses can be reduced. Further, if the certificate invalidation list possessed by the destination is newer than that which is possessed by the source, the source's certificate invalidation list can be updated with the destination's certificate invalidation list while a process is performed for transferring the keys and use condition information.

BRIEF DESCRIPTION OF THE DRAWINGS

FIG. 2 illustrate the characteristics of key data, distribution data, and other data related to a communications ciphering scheme that is used in the first embodiment of the data transfer system shown in FIG. 1.

DETAILED DESCRIPTION OF THE INVENTION

Figure 1:
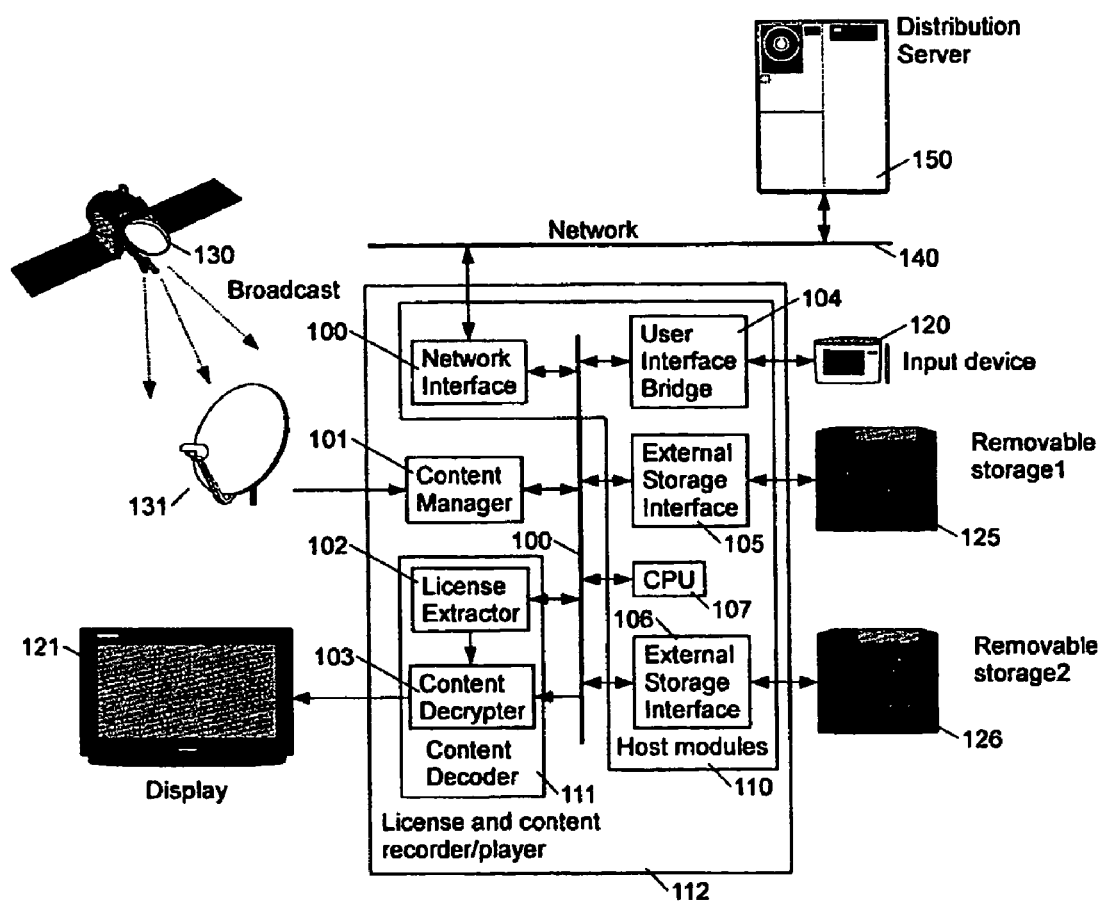
FIG. 1 is a schematic diagram illustrating the overall configuration of a data transfer system according to a first embodiment of the present invention.

Embodiments of a data transfer system and method according to the present invention will now be described in detail with reference to the accompanying drawings. FIGS. 1 through 19 exemplify the embodiments of the present invention. Elements assigned the same reference numerals in the figures are identical with each other and equal in their basic configurations and operations.

FIRST EMBODIMENT

A first embodiment of a data transfer system according to the present invention is a recorder/player that records digital video data, which is received by a tuner, into a magnetic disk unit or the like and plays it back on a display. The recorder/player is hereinafter referred to as a "digital data recorder/player" or abbreviated to "recorder/player". The data recording medium and apparatus are not limited to a magnetic disk and magnetic disk unit. Any medium and apparatus may be used as far as they have the functions described below. For example, a large-capacity memory device having an internal controller may be used. It is assumed that the digital data recorder/player can be connected to the Internet or other information communication network to transmit/receive text, voice, game program, and various other data. These data are hereinafter referred to as "content data". The digital data recorder/player is either stationary or portable.

Data Transfer System Overall Configuration

FIG. 1 schematically shows the overall configuration of a data transfer system according to the present embodiment. As indicated in FIG. 1, the data transfer system comprises a recorder/player 112, an input device 120, which provides a user interface, a display 121, removable storages 125, 126, a receiving antenna 131 for receiving a broadcast from a satellite 130 or the like, and a distribution server 150, which is capable of communicating with the recorder/player 112 via a network 140. The recorder/player 112 comprises a content manager 101, a network interface 100, a user interface bridge 104, external storage interfaces 105, 106, a host module 110, which includes a CPU 107, and a content decoder 111, which includes a license extractor 102 and a content decrypter 103.

Content data, which needs to be handled so as to protect the copyright of its creator, is received by the receiving antenna 131 via a broadcast wave, and then temporarily stored in the content manager 101 of the recorder/player 112 or stored in the distribution server 150. The content manager 101 and distribution server 150 encrypt the content data by using a predetermined encryption method, and then output the content data. In this instance, the employed encryption method may be uniquely defined in compliance with the applicable security specifications.

The removable storages 125, 126 are mounted on the recorder/player 112 via the external storage interfaces 105, 106. The removable storages 125, 126 receive encrypted content data from the content manager 101 of the recorder/player 112 and the distribution server 150, and record the received content data in themselves. When the content data is to be played back, the encrypted content data is transmitted as it is from the removable storages 125, 126 to the content decrypter 103 of the recorder/player 112.

The network interface 100 contained in the host module 110 of the recorder/player 112, the user interface bridge 104 for the input device, the external storage interfaces 105, 106 for external removable storages, and the CPU 107 for controlling these devices provide control over processing and transmission/reception of the data flowing inside the system.

The content manager 101 of the recorder/player 112 and the distribution server 150 not only encrypt the content data but also internally generate and retain the information including the conditions for playing back the content data. This information is hereinafter referred to as the license. In compliance with a request, the license is transferred from the content manager 101 or distribution server 150 to the removable storages 125, 126 or from the removable storages 125, 126 to the license extractor 102.

The license includes a license ID, which provides license identification, a content ID, which identifies the associated content data, key data for decrypting encrypted content data, and conditions for restricting the use of the target content data. The conditions comprise control information UR_s and restriction information UR_d. The control information UR_s is used to interpret the contents and control the output of the license at a transfer source. The restriction information UR_d is used after transfer to the license extractor 102 to determine whether decryption is to be performed with a content key delivered to the content decrypter 103.

In the data transfer system configured as described above, three technologies are necessary for permitting the user to play back encrypted content data. The first technology is a method for encrypting the content data. The second technology is a method for encrypting and transferring a content data encryption key over a communication path. The third technology is a function for preventing recorded content data from being duplicated for use without permission. In the data transfer system according to the present embodiment, the content data is encrypted and freely recorded. Meanwhile, any invalid content data use is restricted by ensuring that the license for using the content data can be transferred only when the party who wishes to acquire the license and the party who possesses the license are both authorized while the use conditions defined for the license are observed. The function for mutually authenticating the content data transfer source and destination in a situation where the content data is to be recorded and played back will now be described in detail.

Encryption Key and Data Structure

FIG. 2 illustrates the characteristics of cryptographic key data and distribution data for communication for use in the data transfer system according to the present embodiment shown in FIG. 1. The data transmitted from the transfer source is the content data, which includes video data. As described later, the content data is transmitted to the content manager 101, distribution server 150, and removable storages 125, 126 in the form of encrypted data {Data}K_c, which is decryptable by a content key K_c. Subsequently, the symbol {D}X represents information that is obtained by converting data D to a cipher that is decryptable by key data X. If key data X is symmetric cipher key data, the data is encrypted with key data X. If, on the other hand, key data X is an asymmetric cipher secret key or public key, data D is encrypted with a corresponding public key data or secret key data Y, which differs from key data X. Subsequently, the asymmetric cipher public key data is abbreviated to a public key or public key data; the asymmetric cipher secret key data is abbreviated to a secret key or secret key data; and the symmetric cipher key data is abbreviated to a common key or common key data. If data D is electronically signed, the symbol {D}X is also used. It means that the hash value of a data set containing data D, which is targeted for an electronic signature, is encrypted with secret key Y, which corresponds to public key X. Key K_x in the specification corresponds to the symbol Kx in the figures.

The keys related to a process for content data encryption, decryption, or playback and a process for authentication of the content decoder 111, removable storages 125, 126, distribution server 150, and content manager 101 will be described below. The content key K_c is used for encrypting and decrypting the content data. The distribution server 150, content manager 101, and content decoder 111 are individually provided with an electronically signed public key KP_dc, which is used for mutual authentication. The data encrypted with the public key KP_dc can be decrypted with a corresponding secret key K_dc. One secret key data is allocated to a limited number of distribution servers, content managers, removable storages, and content decoders. The unit for KP_dc/K_dc sharing is called a class. As regards the apparatuses and modules belonging to the same class, the sections for license transfer, recording, and management are incorporated in such a manner as to meet specific requirements. It means that they use the same license transfer method. These apparatuses and modules are hereinafter referred to as the devices.

The public key KP_dc is joined to other generation information and electronically signed by a predetermined certification authority to serve as a device certificate. The public key of a certification authority for electronic signature is referred to as KP_CA, whereas the corresponding secret key is referred to as K_CA. These keys are hereinafter referred to as the certification authority public key and certification authority secret key. The general information written in the certificate includes the certificate issuer and serial number. The public key KP_dc, which is in {KP_dc}KP_CA form, is embedded in each device prior to shipment. The public key KP_dc is hereinafter referred to as the device class public key. The secret key for decrypting data encrypted with the device class public key is hereinafter referred to as the device class secret key. For each device, the public key KP_d to be individually embedded and the secret key K_d for decrypting data encrypted with the public key KP_d exist. These keys are hereinafter referred to as the device public key and device secret key, respectively.

Common keys K_sn(n ? 0) and K_ch are also used in the data transfer system according to the present embodiment. Whenever a license is to be transferred between two different devices, common key K_sn(n ? 0) is generated at a transfer destination to achieve data encryption. Common key K_ch is generated at a transfer source to encrypt common key K_sn(n ? 0) whenever a mutual authentication process is performed between devices for transmitting common key K_sn(n ? 0) from the transfer destination to the transfer source. Common keys K_ch and K_s0 may be used as fixed keys once they are generated. However, common key K_sn(n ? 1) is always updated from K_sm to K_s(m+1) before use each time a license transfer is made. Common key K_ch is hereinafter referred to as the challenge key. Common key K_s0 is hereinafter referred to as the session invariable key. Common key K_sn(n ? 0) is hereinafter referred to as the session time-variant key.

Removable Storage Configuration

Figure 3:
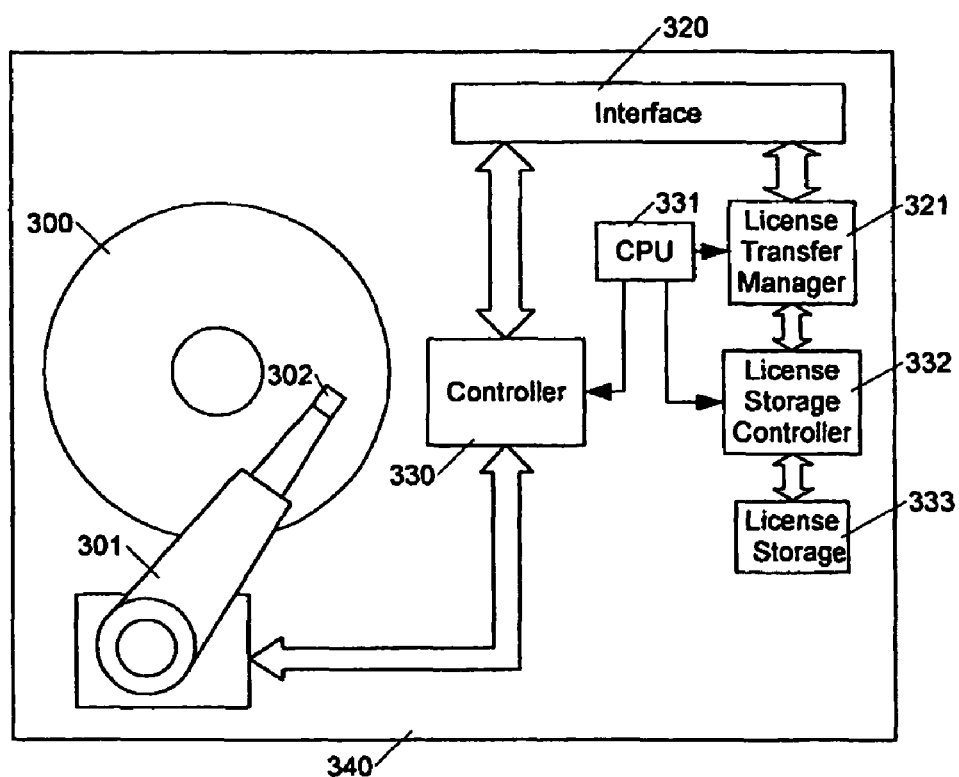
FIG. 3 is a block diagram illustrating the internal configuration of a removable storage that is shown in FIG. 1.

FIG. 3 is a block diagram illustrating the internal configuration of a removable storage shown in FIG. 1. Data is input into and output from the removable storage via an interface 320. A head 302 records input data, which is entered from the outside, onto a magnetic disk 300 via a controller 330. The direction of a data flow reverses when the removable storage reads data. The controller 330 is also controlled by a CPU 331.

When the distribution server 150 or the content manager 101 of the recorder/player 112 transfers a license to the removable storage for recording purposes, a license transfer manager 321 performs a necessary protocol process and cryptographic computation process. When the license is actually transmitted to the license transfer manager 321, a license storage manager 332 records the license in a license storage 333. FIG. 3 indicates that the license storage 333 is separate from the magnetic disk 300. However, if only different specific access methods are applicable to the read and write of encrypted content data and if the employed configuration does not permit the removable storage to be disassembled or otherwise manipulated to directly read or otherwise handle internal data, the license may be recorded onto the magnetic disk 300.

Figure 4:
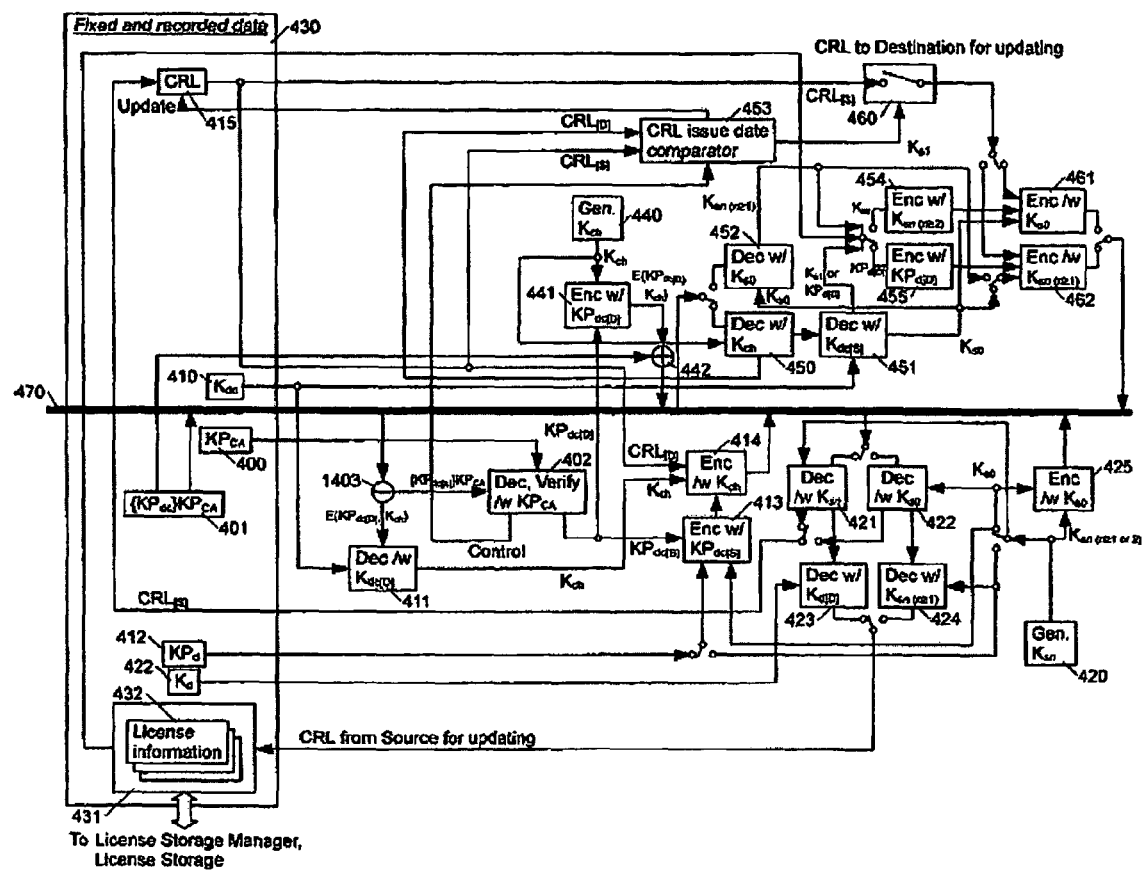
FIG. 4 illustrates in detail the internal configuration of a license transfer manager of the removable storage shown in FIG. 3.

FIG. 4 illustrates in detail the internal configuration of the license transfer manager 321 of the removable storage shown in FIG. 3. A static storage area 430 is provided in the license transfer manager 321. Embedded in the static storage area are a certificate {KP_dc}KP_CA (401) about the device that is electronically signed by the certification authority, a public key KP_CA (certification authority public key, 400) that is issued by the certification authority for decrypting the electronic signature of the certificate 401, a public key KP_d (device public key, 412) specific to the device, and a device secret key K_d (device secret key, 422) for decrypting data that is encrypted with key KP_d (412). Meanwhile, area 431 is provided for temporarily storing a list of invalid certificates (certificate invalidation list) 415 and a license read from the license storage 333 as rewritable information.

Operation Performed in a License Write Process

The input/output operation relative to the license transfer manager 321 is performed via a bus 470. When a license is to be written into the license storage 333, the modules positioned below the bus 470 in FIG. 4 are mainly used. These modules will now be sequentially described.

Module 411 decrypts data that is encrypted with a device class public key KP_dc[D], which module 411 transmitted to the transfer destination in the form of a certificate, with a corresponding device class secret key K_dc[D]. Module 411 is designated Dec/w K_dc[D]. It means that module 411 is a decrypter that achieves decryption by using a device class secret key K_dc as a key. The symbol [D] in the suffix indicates that the module performing computations with the above key functions as a license transfer destination. The symbol [S] in the suffix indicates that the module performing computations with the above key functions as a license transfer source. When the symbols [D] and [S] are used subsequently, it is assumed that they represent a destination and a source, respectively. The license transfer source and license transfer destination are hereinafter referred to as the transfer source and transfer destination, respectively.

Module 402 verifies a certificate that includes a device class public key KP_dc[S] and is transmitted from the transfer source. The certification authority public key KP_CA (400) is used for electronic signature verification. When the validity of the device class public key KP_dc[S] is verified, it is transmitted to module 413.

Module 413 joins a session invariable key K_s0, which is generated by module 420, to the device public key KP_d or session time-variant key K_sn(n ? 1), which is embedded in module 413, and then encrypts the joined data with the transfer source's device class public key KP_dc[S], which is transmitted from module 402. The keys K_s0 and K_sn(n ? 1) are generated by module 420. Whether the device public key KP_d or session time-variant key K_sn(n ? 1) is to be joined to K_s0 is determined for each license to be transferred. The transfer source notifies module 413 in advance whether the device public key KP_d or session time-variant key K_sn(n ? 1) is to be joined to K_s0. Joining computations are performed in accordance with such advance information. Data that has been encrypted with the transfer source's device class public key KP_dc[S] is transmitted to module 414. The encryption process to be performed by module 413 need not always be performed after the sharing of the session invariable key K_s0 between the transfer source and destination is completed.

Module 414 encrypts the data output from module 413 with the challenge key K_ch, which is decrypted by module 411 and output. This encryption process is performed after the certificate invalidation list recorded in module 414 is joined to the data output from module 413. The encrypted data is transmitted to the transfer source via the bus 470 and interface 320.

Module 421 decrypts the data transmitted from the transfer source via the interface 320 and bus 470 with the session invariable key K_s0 and session time-variant key K_sn(n ? 1). Module 422 achieves decryption by using the session invariable key K_s0 only. The session invariable key and session time-variant key are generated by module 420. Subsequently, these keys are transmitted to modules 421 and 422 the moment they are transmitted to module 413. If the data decrypted by module 421 includes the transfer source's certificate invalidation list, module 421 overwrites its own certificate invalidation list with the decrypted data. As regards data other than the certificate invalidation list, the output from module 421 is transmitted to module 423, whereas the output from module 422 is transmitted to module 424.

Module 423 decrypts the data output from module 421 with the device secret key K_d[D] embedded in module 423. Module 424 achieves decryption with the session time-variant key K_sn(n ? 1). Whether the device secret key K_d[D] or session time-variant key K_sn(n ? 1) is used for decryption is determined depending on which key has encrypted the license transmitted from the transfer source. Module 413 joins either the device public key or session time-variant key to the session invariable key K_s0. Decryption is performed in either module 423 or module 424 by using the same key that is involved in joining. When this decryption process is performed, the license transmitted from the transfer source is acquired. The acquired license is stored in a license temporary storage area 431 within the license transfer manager 321 and then recorded in the license storage 333.

Operation Performed in a License Read Process

When a license is to be read from the license storage 333, the modules positioned above the bus 470 in FIG. 4 are mainly used. These modules will now be sequentially described.

Module 441 is capable of encrypting the challenge key K_ch generated by module 440 with the device class public key KP_dc[D], which is transmitted from the transfer destination in the form of a certificate. The encrypted data is transmitted to the transfer destination via the bus 470 and interface 320.

The challenge key K_ch generated by module 440 also enters module 450. Module 450 uses the received challenge key K_ch to decrypt the data input from the bus 470. However, the data transmitted from the bus 470 enters either module 450 or module 452. The details will be given later with reference to FIG. 5 and beyond. In brief, if the session invariable key K_s0 is still not shared by the transfer source and destination after mutual authentication is completed between the transfer source and destination, the data transmitted from the bus 470 enters module 450. If, on the other hand, the session invariable key K_s0 is already shared, the data enters module 452.

Module 450 decrypts the data that is input from the bus 470 by using the challenge key K_ch, and then inputs the decrypted data into module 451. Module 451 decrypts the input data with its own device class secret key 410. However, the data output from module 450 is not always encrypted at the transfer destination by using module 450's own device class public key. Decryption occurs at the transfer destination only before the transfer source and destination share the session invariable key K_s0. After the session invariable key K_s0 is shared, the process to be performed by module 451 is not actually performed because no encryption is performed at the transfer destination by using the transfer source's device class public key. As regards the data acquired at module 451 after decryption, the session time-variant key is transmitted to module 454; the transfer destination's device public key KP_d[D], to module 455; and the session invariable key K_s0, to modules 461 and 462.

Modules 454 and 455 encrypt a license 432 with the input key data. As regards the encrypted license, the output from module 454 enters module 461 whereas the output from module 455 enters module 462.

Once the session invariable key K_s0 is shared by the transfer source and destination, the data transmitted to the bus 470 enters module 452. Module 452 decrypts the input data with the session invariable key K_s0. The output from module 452 is always the session time-variant key K_sn(n ? 1). The acquired key data is transmitted to module 462. In other words, module 462 encrypts the input data with a session key K_sn(n ? 0) that varies with time, whereas module 461 encrypts the input data with a session key K_s0 that does not vary with time.

Prior to the above encryption process, module 453 compares the issue date/time information about the certificate, which is indicated in the transfer destination's certificate invalidation list transmitted from the transfer destination, against the own information about the issue date/time. The transfer destination's certificate invalidation list is included in module 450's output result (challenge key decryption result). If the comparison result indicates that the issue date/time of the own certificate invalidation list 415 is earlier than that of the counterpart, the transfer destination's certificate invalidation list overwrites the own certificate invalidation list 415. If, on the contrary, the issue date/time of the transfer destination's certificate invalidation list is earlier, the own certificate invalidation list 415 is transmitted to module 461 or 462. If the certificate invalidation list is not transmitted from the transfer destination, the transfer source does not transmit a certificate invalidation list.

The destination to which the certificate invalidation list 415 is transmitted is determined depending on which key data is used to encrypt the input data. Module 461 or 462 joins the own certificate invalidation list 415 to the result output from module 454 or 455, and then performs encryption with the key data described in the preceding paragraph. In general, the certificate invalidation list 415 is joined to the result output from module 454 or 455 for the purpose of reducing the encryption computation load only once after the session invariable key K_s0 is shared. (In reality, however, this joining process may be performed any number of times.) The license, which has been doubly encrypted as described above, is transmitted to the transfer destination via the bus 470 and interface 320 as the output from module 461 or 462.

Configurations and Operations of the Distribution Server and Content Manager

The distribution server 150 and the content manager 101 of the recorder/player 112 shown in FIG. 1 are capable of generating and issuing a license. Therefore, the distribution server 150 and content manager 101 have internal modules required for a license write, which has been described above. However, the distribution server 150 and content manager 101 do not always need to have the license temporary storage area 431 or license storage because they generate a license themselves. Instead, a license creator, which is capable of generating a license, is positioned in place of them.

Content Decoder Configuration and Operation

The content decoder 111 is capable of decrypting content data and displaying it on the display 121. The content decrypter 103 is capable of decrypting encrypted content data and turning it into a motion picture data stream. The license extractor 102 transmits a key for decrypting encrypted content data to the content decrypter 103. The license extractor 102 performs a predetermined procedure for receiving an encrypted license, for instance, from the removable storages 125, 126, content manager 101, and distribution server 150. Therefore, the license extractor 102 has a module necessary for performing the license read operation described above. A license transmitted from the transfer source is stored in the license temporary storage area 431 and then transmitted to the content decrypter 103. The license transmitted from the transfer source in the above instance may be the entire license or the minimum information required for decrypting encrypted content data, that is, only a content key and UR_d for exercising control to determine whether or not to decrypt content data. In this instance, it is assumed that the host module knows the content ID of the content data to be decrypted, the content ID of the content data to which the license transmitted to the content decoder 111 corresponds, and the own license ID.

Transfer Source-Host Module-Transfer Destination Processing Flow

The processes that are performed by the transfer source, the host module, which controls the processes during their execution, and the transfer destination for the purpose of transferring a license from the transfer source to the transfer destination will now be described with reference to FIGS. 5 through 9. The following description assumes that the license/content transfer destination is a removable storage and that the license transfer source is the content manager 101. However, the present invention is not limited to such a configuration.

Figure 5A:
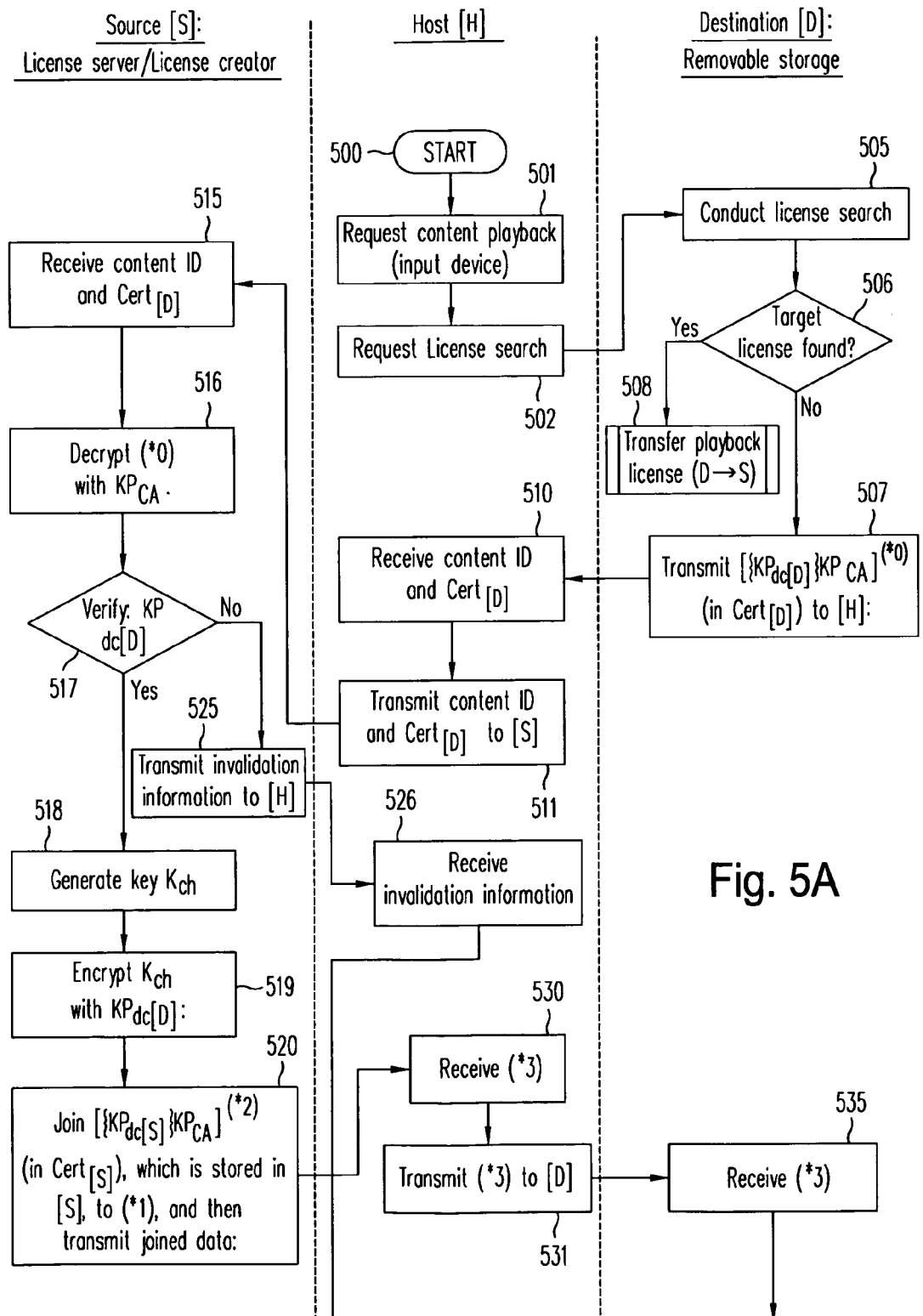
FIG. 5 is a flowchart illustrating the processes that the transfer source, the host module for controlling the processes during their execution, and the transfer destination perform to transfer a license from the transfer source to the transfer destination in the first embodiment of the data transfer system shown in FIG. 1.
Figure 5B:
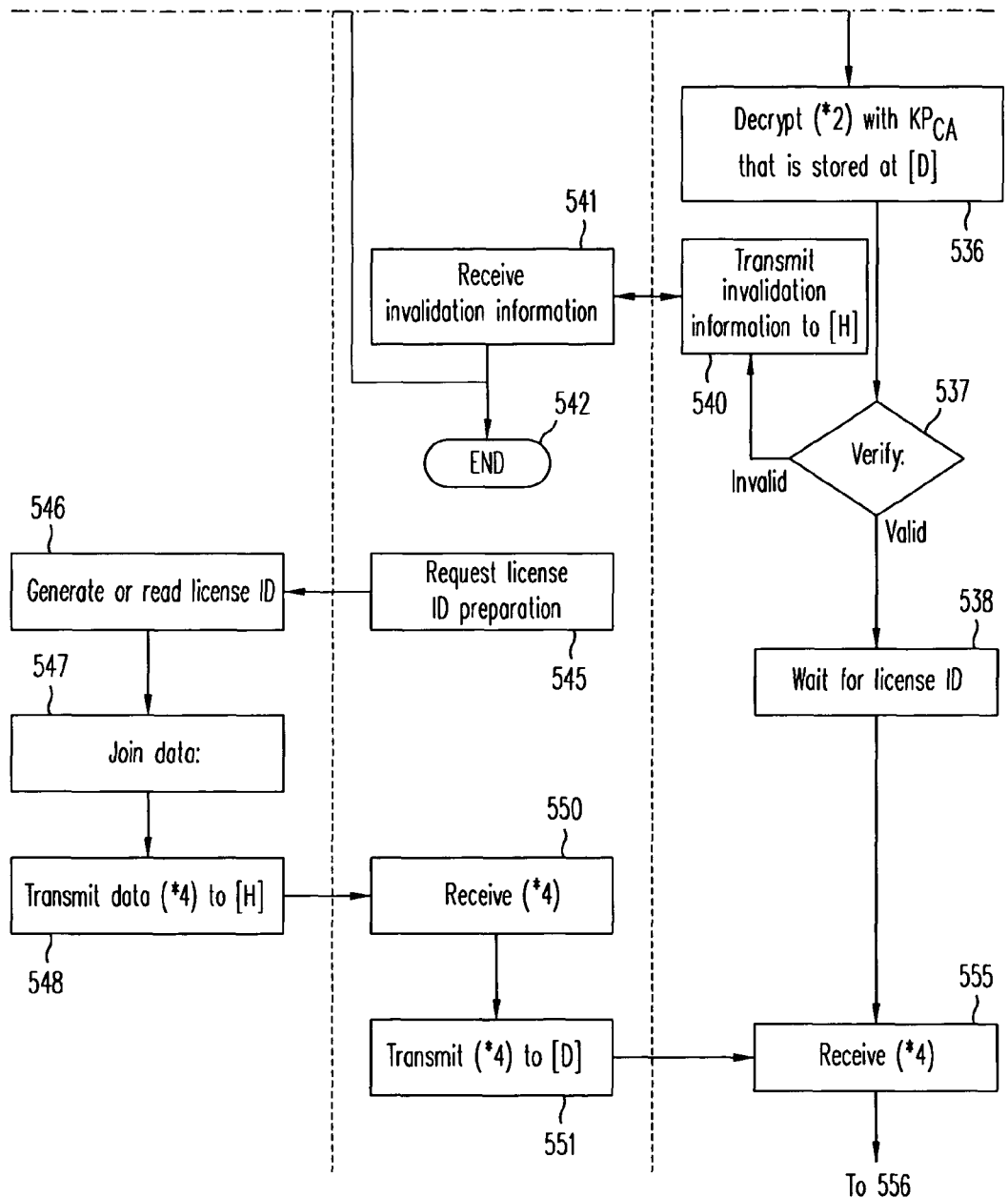

As indicated in FIG. 5, at the start (step 500) the content user uses the input device 120 or the like to issue a content playback request from the host module (step 501). In this instance, the host module issues a search request to the removable storage to search the removable storage connected to the host module and determine whether the target content and its license are already acquired (step 502). The search is conducted with a license ID that is uniquely assigned to each license.

Upon receipt of the request, the removable storage notes the transmitted license ID and searches the license storage 333 (step 505) to judge whether the target license exists therein (step 506). If the judgment result indicates that the target license exists, the target license is transferred to the content decoder 111 (step 508). If the target license does not exist, processing step 507 is performed. The procedure for transferring the license to the content decoder 111 will be described later.

If the user does not specify a license search but makes a request for instant recording of content and license for the purpose of recording television broadcast content or the like, the program flow skips the processing steps for issuing a search request to the transfer destination removable storage and conducting a search in the removable storage and proceeds to processing step 507.

Processing step 507 is performed to transmit the transfer destination's certificate to the host module. The transfer destination's certificate carries an electronic signature that is obtained by encrypting the hash value of the locally contained data with the certification authority's secret key K_CA. The locally contained data includes a locally assigned device class public key KP_CA and the information indicating its issuer. Since the data can be verified with KP_CA, it is designated {KP_dc[D]}KP_CA or abbreviated to (*0).

Upon receipt of the certificate data (step 510), the host module 110 transmits the certificate data and the content ID of the content targeted for decryption to the transfer source (step 511).

The transfer source receives the transmitted certificate of the transfer destination (step 515), and decrypts the electronic signature of the certificate with the certification authority's public key KP_CA, which is locally embedded (step 516). Further, the transfer source calculates the hash value of the data in the transmitted certificate by a predetermined method. If the calculation result agrees with the electronic signature section value derived from decryption with KP_CA, it means that the transmitted certificate is not falsified. Therefore, the validity of the certificate and the validity of the transfer destination's device class public key KP_dc[D] are authenticated. If, on the other hand, the certificate is found to be invalid, the invalid information is transmitted to the host module (step 525). Upon receipt of the invalid information, the host module terminates the process immediately because the transfer destination is illegal (step 542).

Even when the validity of the certificate is authenticated, it does not always mean that the certificate is embedded in the removable storage that is actually connected to the recorder/player as the transfer source. Therefore, an additional process needs to be performed as described below.

When the validity of the certificate transmitted from the transfer destination is verified, the transfer source generates a temporary symmetric cipher key or challenge key K_ch within the own key generator (step 518). At the transfer source, the generated challenge key K_ch is encrypted with the device class public key KP_dc[D], which is transmitted from the transfer destination in the form of a certificate (step 519). The data E(KP_dc[D], K_ch) derived from the above process is hereinafter referred to as (*1).

In processing step 520, the transfer source's certificate is joined to data (*1). As is the case with the transfer destination's certificate, the transfer source's certificate carries an electronic signature that is obtained by encrypting the hash value of the locally contained data with the certification authority's secret key K_CA. The locally contained data includes a locally assigned device class public key KP_CA and the information indicating its issuer. Since the data can be verified with KP_CA, which is embedded in the transfer source, it is designated {KP_dc[S]}KP_CA or abbreviated to (*2). The data obtained by joining data (*1) to data (*2) is hereinafter referred to as (*3). Data (*3) is transmitted to the host module (step 520).

Upon receipt of data (*3) (step 530), the host module 11 transmits it to the transfer destination (step 531). Upon receipt of data (*3) from the host module (step 535), the transfer destination decrypts the electronic signature in the data with the certification authority's public key KP_CA, which is embedded locally (step 536). The validity of the certificate is then verified by using exactly the same method as used in the transfer source, that is, by judging whether the hash value of the contained data agrees with the electronic signature data decrypted with KP_CA (step 537). If the certificate is found to be invalid, the transfer destination transmits the invalid information to the host module (step 540). Upon receipt of the invalid information (step 541), the host module terminates the process immediately because the transfer source is illegal (step 542). If, on the other hand, the certificate is found to be valid, the transfer destination becomes ready to receive the license ID of the target license (step 538).

While the transfer destination is ready to receive the license ID (step 538), the host module 110 issues a request for license ID generation or a read request from the license storage 333, to the transfer source (step 545).

Figure 6:
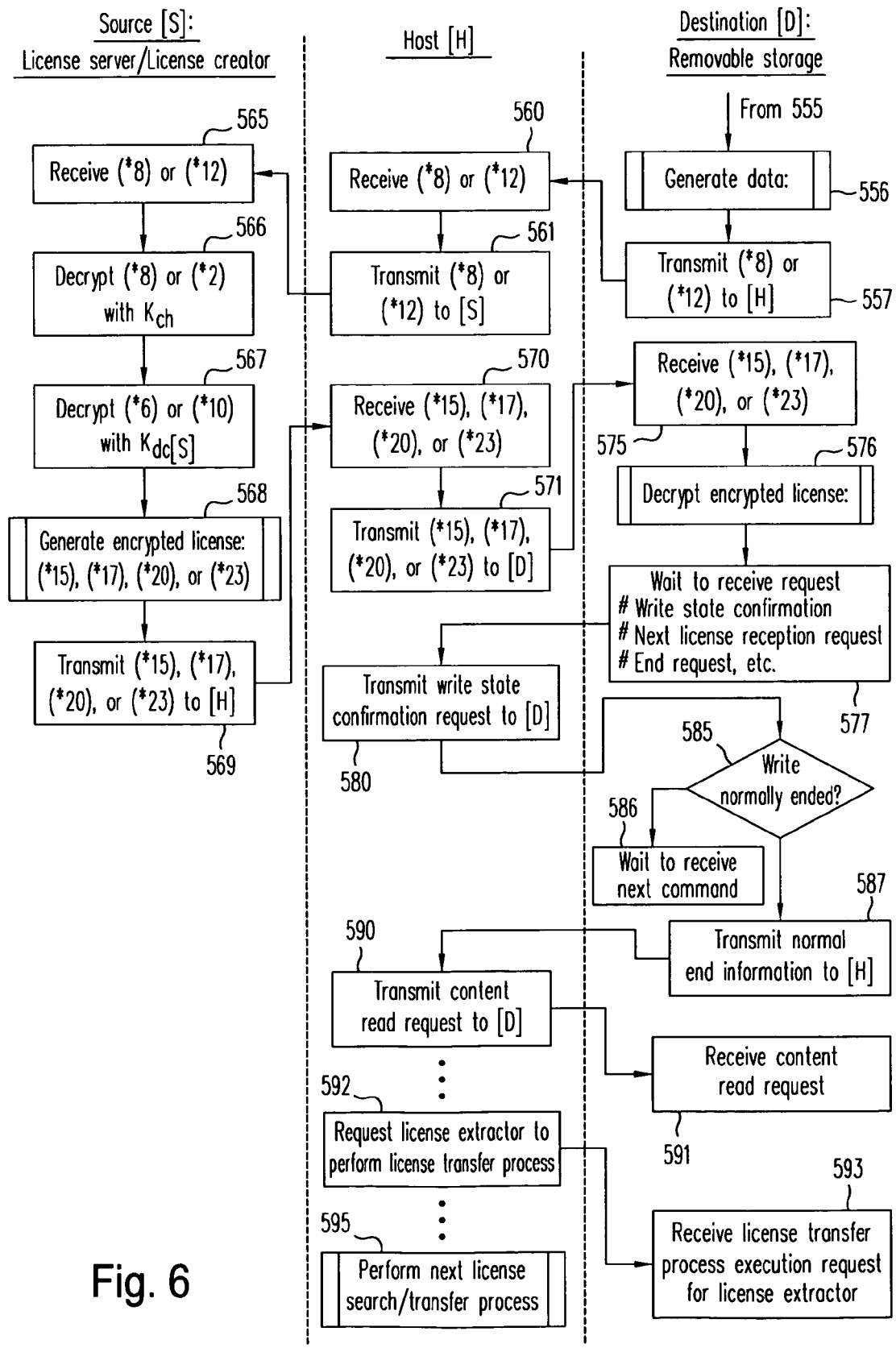
FIG. 6 is a flowchart illustrating the processes that the transfer source, the host module for controlling the processes during their execution, and the transfer destination perform to transfer a license from the transfer source to the transfer destination in the first embodiment of the data transfer system shown in FIG. 1.

In compliance with the request, the transfer source generates or reads the target license (step 546). Then, before the license transmission to the transfer source, the information indicating the transfer source's device public key KP_d[D] or session time-variant key K_sn (referred to as the key type in the figures and in the subsequent description) is joined to the license ID of the target license to indicate the type of a key required for encryption (step 547). The key type information for all licenses is individually written in a single field 1903. It is assumed that licenses according to the present embodiment are in such a format. The data created in this manner is hereinafter referred to as (*4). The transfer source transmits data (*4) to the host module 110 (step 548). Upon receipt of data (*4) (step 550), the host module 110 transmits it as it is to the transfer destination (step 551). Upon receipt of data (*4) in step 555, the transfer destination proceeds to processing step 556, which is shown in FIG. 6, and creates certain data that is encrypted with the challenge key K_ch created at the transfer source.

Figure 7:
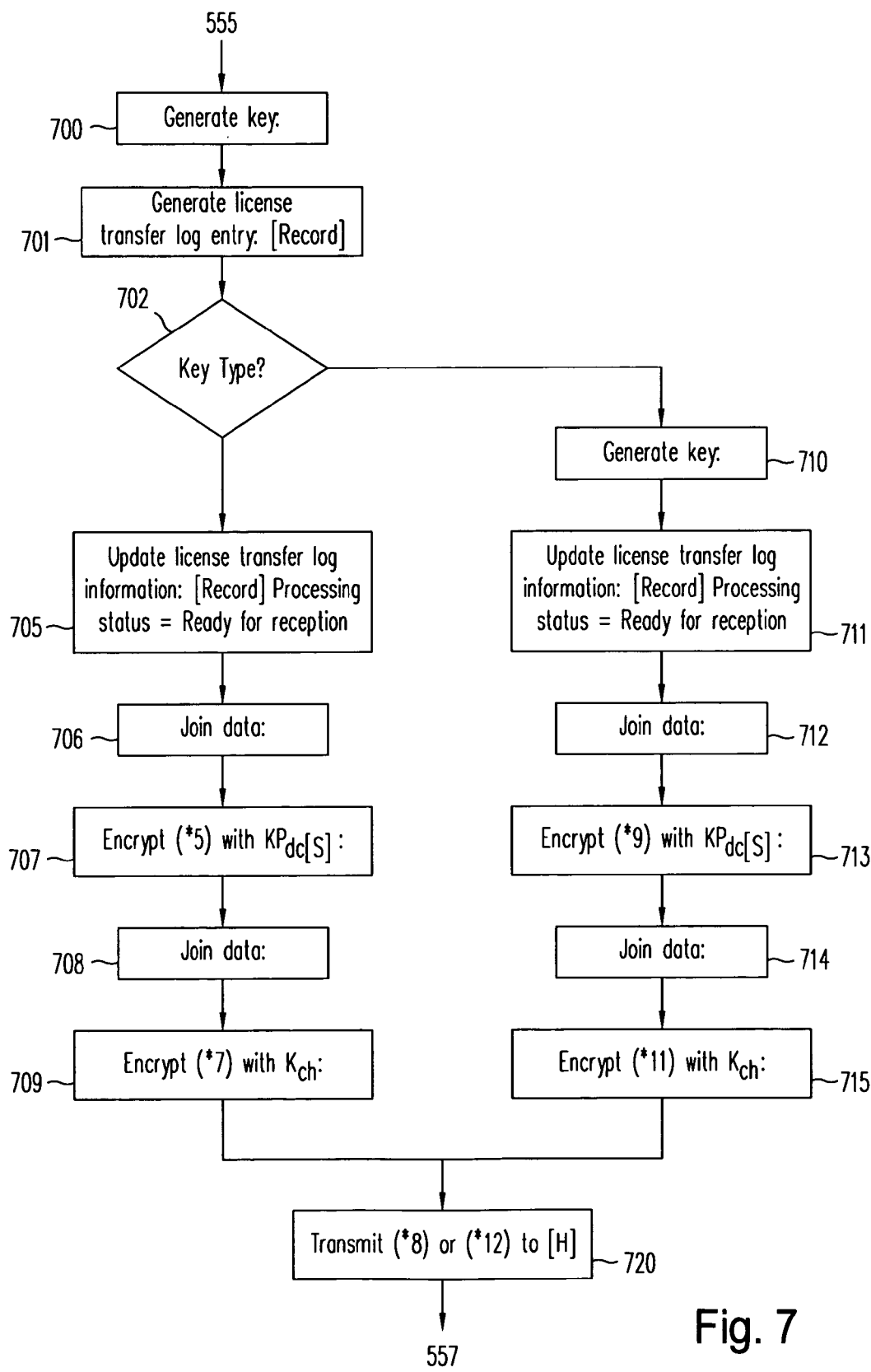
FIG. 7 is a flowchart illustrating the processes that the transfer source, the host module for controlling the processes during their execution, and the transfer destination perform to transfer a license from the transfer source to the transfer destination in the first embodiment of the data transfer system shown in FIG. 1.

Processing step 556 will now be described in detail with reference to FIG. 7. As indicated in FIG. 7, the transfer destination receives data (*4) and then generates the session invariable key K_s0 (step 700). If the license transfer is not normally completed, the transfer destination generates a transfer log entry to prevent the license from disappearing from the transfer source and destination. At this stage, the transfer destination records the license ID for identifying the license to be transferred and the generated session invariable key K_s0 for the entry (step 701). Next, step 702 is performed to note the key type transmitted from the transfer source and judges whether or not to generate a session time-variant key. If the key type states that the transfer source's device public key KP_d[D] is required for license encryption, the program flow proceeds to processing step 705 so as to update part of the previously generated license transfer log information. The field for writing the processing status is to be updated to indicate that the preparation for reception is completed (step 705). Next, step 706 is performed to generate data (*5), which is obtained by joining the previously generated session invariable key K_s0 to the device public key KP_d[D]. Data (*5) is encrypted with KP_dc[D] in step 707, which is contained in the certificate transmitted from the transfer source. The data derived from such encryption is hereinafter referred to as (*6). As a result of such encryption, the transfer source module cannot decrypt data (*6) even when it receives data (*6) unless it possess at least a secret key K_dc[S] for the device class public key KP_dc[S] contained in the certificate. Therefore, even when the certificate transmitted from the transfer source does not agree with the module that actually attempts to transfer the license, the module cannot acquire the key if it does not have a device class secret key authorized at least by the certification authority. Consequently, the transfer destination can reject a license transfer from a transfer source that is not authorized by the certification authority.

Next, the own certificate invalidation list is joined to data (*6) in step 708 to create data (*7). Data (*7), which is created in the above manner, is then encrypted with the previously acquired challenge key K_ch in step 709. The resulting encrypted data is hereinafter referred to as (*8). If the received key type states that the session time-variant key is required for encrypting the license to be transferred, the transfer source generates the session time-variant key K_s1 (step 710). After completion of session time-variant key generation, step 711 is performed to update the session time-variant key field for the license transfer log and the field for recording the processing status. The processing status is such that the preparation for reception is completed.

After the update of the license transfer log, the two generated session keys, namely, the session invariable key K_s0 and session time-variant key K_s1, are joined together (step 712). The resulting joined data is hereinafter referred to as (*9). As is the case with processing step 707, data (*9) is encrypted with the device class public key KP_dc[S] that is included in the transfer source certificate in step 713. The meaning of encryption, which is performed for safety assurance, is as described earlier. The data encrypted with the device class public key KP_dc[S] is hereinafter referred to as (*10). The own certificate invalidation list is joined to data (*10) to generate data (*11) (step 714). Data (*11), which is generated in the above manner, is encrypted with the previously acquired challenge key K_ch (step 715). The resulting encrypted data is hereinafter referred to as (*12). Data (*8) or data (*12) can be transmitted to the host module (step 720). The process performed in step 556 in FIG. 6 is now completed.

Turning back to FIG. 6, step 557 is performed to transmit data (*8) or data (*12) to the host module in accordance with the key type information transmitted from the transfer source (step 557). Upon receipt of the transmitted data (step 560), the host module 110 transmits it as it is to the transfer source (step 561). Upon receipt of data (*8) or data (*12) in step 565, the transfer source decrypts it with the challenge key K_ch that was locally generated (step 566). The result obtained by decrypting data (*6) or data (*10) with KP_dc[S] is data (*5) or data (*9) (step 567). When the decryption processes performed in steps 567 and 568 terminate, the transfer source acquires the session invariable key K_s0 created by the transfer destination or the transfer source's device public key KP_d[D] or session time-variant key K_s1.

Figure 8:
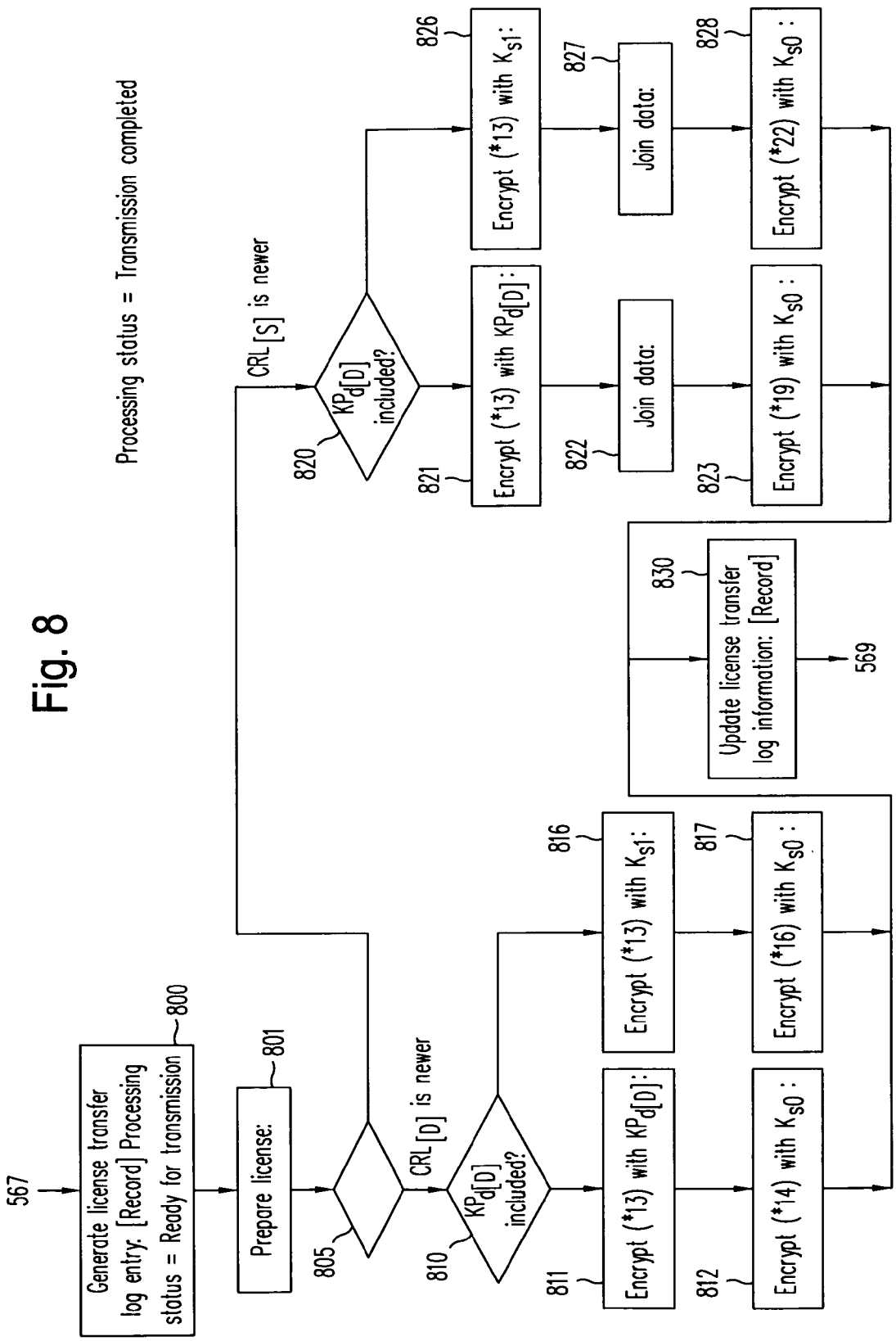
FIG. 8 is a flowchart illustrating the processes that the transfer source, the host module for controlling the processes during their execution, and the transfer destination perform to transfer a license from the transfer source to the transfer destination in the first embodiment of the data transfer system shown in FIG. 1.

As described above, the transfer destination's certificate invalidation list and data (*5) or data (*9) are used to perform step 568 to create an encrypted license. Processing step 568 will now be described in detail with reference to FIG. 8. As shown in FIG. 8, the transfer source, which has acquired the session invariable key K_s0 created at the transfer destination or the transfer source's device public key KP_d[D] or session time-variant key K_s1, first generates a license transfer log entry as is the case with the transfer destination. The objective of generating a license transfer log is the same as for the transfer destination. More specifically, the license transfer log is generated in order to prevent the license from being lost when the license transfer is not normally completed. The generated log records the license ID of the license to be transmitted, the session invariable key K_s0, the transfer destination's device public key KP_d[D] or session-time-variant key K_s1, and the processing status (so as to indicate that the preparation for license transmission is completed) (step 800). Next, step 801 is performed to prepare the license to be transferred. As regards the removable storage, processing step 546 was already performed in most cases to read from the license storage 333 the license to be transferred. However, if the transfer source is the content manager 101 or distribution server 150, the license in a predetermined format is prepared at this stage at the latest. The license is in "license ID||content ID||K_c||UR_s||UR_d||service-specific information" form. The symbol || is used to indicate that neighboring data are joined together. The service-specific information is particularly used, for instance, in a distribution service to represent a field including, for instance, restriction information that is uniquely defined by a service provider. The license data that has been prepared in the process described above is hereinafter referred to as (*13).

After the license is prepared, the issue date/time of the certificate invalidation list CRL_[D] transmitted from the transfer source is compared against that of the certificate invalidation list possessed by the transfer source. It is assumed that the issue dates/times are indicated in the certificate invalidation lists (step 805). If the comparison result indicates that the issue date/time of the own certificate invalidation list is later than that of the other, processing steps 820 and beyond will be performed. If, on the other hand, the transfer destination's certificate invalidation list is newer than the other, processing steps 806 and beyond will be performed.

If the issue date/time of the transfer destination's certificate invalidation list is later than that of the other, the received transfer destination's certificate invalidation list overwrites the own certificate invalidation list (step 806). Next, step 810 is performed to judge whether the target license needs to be encrypted with the transfer destination's device public key KP_d[D]. If the license indicates that such encryption is required, the program flow proceeds to processing step 811. If not, the program flow proceeds to processing step 816. In processing step 811, the license (*13) is encrypted with the transfer destination's device public key KP_d[D] to generate data (*14). Subsequently, data (*14) is encrypted with the session invariable key K_s0 to generate data (*15) in step 812. In processing step 816, the license (13*) is encrypted with the session time-variant key K_s1 (*16) and encrypted with the session invariable key K_s0 to generate data (*17) in step 817.

Meanwhile, processing step 820 is performed, as is the case with processing step 810, to judge whether the target license needs to be encrypted with the transfer destination's device public key KP_d[D]. If such encryption is required, the program flow proceeds to processing step 821. If not, the program flow proceeds to processing step 826. In processing step 821, data (*18) whose license (13*) is encrypted with the transfer destination's device public key KP_d[D] is generated. In processing step 826, data (*21) whose license (13*) is encrypted with the session time-variant key K_s1 is generated. After data (*18) or data (*21) is generated, the data is joined to the locally possessed certificate invalidation list in order to update the transfer destination's certificate invalidation list (step 822 or 827). The data generated in processing step 822 is referred to as (*19). The data generated in processing step 827 is referred to as (*22). Data (*19) or data (*22) is subsequently encrypted with the session invariable key K_s0 (step 823 or 828). The data obtained by encrypting data (*19) with the session invariable key K_s0 is referred to as (*20). The data obtained by encrypting data (*22) with the session invariable key K_s0 is referred to as (*23).

When data (*15), (*17), (*20), or (*23) is generated as described above, the transfer source handles the license transfer log's processing status recording field so as to indicate that the transmission is completed (step 830), and transmits the generated data to the host module 110. The process performed in step 568 in FIG. 6 is now completed.

After receiving any of the above four encrypted licenses as indicated in FIG. 6 (step 570), the host module 110 transmits the received license as it is to the transfer destination (step 571). Upon receipt of data (*15), (*17), (*20), or (*23), which has been transmitted from the host module 110 (step 575), the transfer destination decrypts the license and records the decrypted license in the license storage 333 (step 576).

Figure 9:
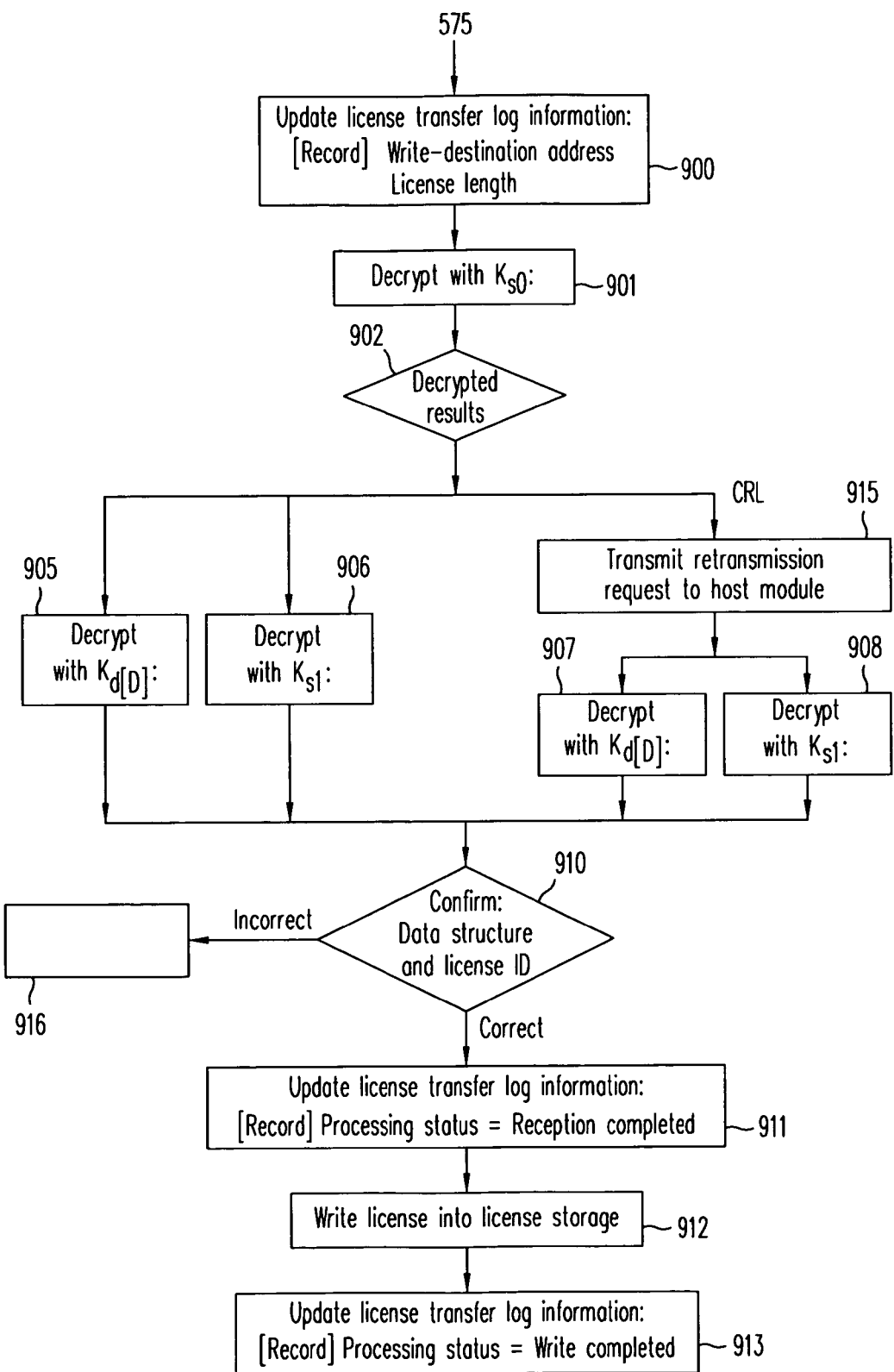
FIG. 9 is a flowchart illustrating the processes that the transfer source, the host module for controlling the processes during their execution, and the transfer destination perform to transfer a license from the transfer source to the transfer destination in the first embodiment of the data transfer system shown in FIG. 1.

The process performed in step 576 will now be described in detail with reference to FIG. 9. When the host module (particularly, external storage interface 105 or 106 in this instance) issues a write command for performing a certain data write process in relation to the removable storage under normal conditions, it simultaneously specifies the write-destination address and transfer data length. As indicated in FIG. 9, the removable storage, which is the transfer destination, records the write-destination address for the designated license and the length of the encrypted license data to be transferred in a field of the license transfer log that was generated in processing step 701 (step 900). After termination of recording into the license transfer log, the received data is decrypted with the session invariable key K_s0 (step 901). After the result of decryption is obtained, one of four different processing steps is performed depending on which key is used for encrypting the received license (step 902). If the license is encrypted with the own device public key KP_d[D], the program flow proceeds to either processing step 905 or processing step 907. Processing step 907 is performed when the result derived from decryption with the session invariable key K_s0 includes the transfer source's certificate invalidation list. If the license is encrypted with the session time-variant key, either processing step 906 or processing step 908 is performed. Processing step 908 is performed, as is the case with processing step 907, when the result derived from decryption with the session invariable key K_s0 includes the transfer source's certificate invalidation list. Processing steps 907 and 908 are performed when the issue date/time of the transfer source's certification invalidation list is later than that of the transfer destination's certificate invalidation list. Therefore, processing step 915 is performed so that the received list overwrites the own one. In the other respects, the process is equivalent to the process performed in steps 905 and 906. More specifically, the process is performed to decrypt the encrypted license with a necessary key. All the data derived from the decryption process performed in steps 905, 906, 907, and 908 constitute the license data main body (*13).

When the license data main body is obtained, the transfer destination verifies the structure of the license (step 910). If the verification result indicates that the license ID, content ID, and the like are included in proper formats, the program flow proceeds to processing steps 911 and beyond. If the data structure is in error, the transfer destination transmits a request to the host module 110, thereby asking the host module 110 to retransmit the encrypted license (step 915). If, on the other hand, the data structure is normal, step 911 is performed to set the license transfer log's processing status field, thereby indicating that the reception is completed. Step 912 is then performed to write the license in the license storage 333. Subsequently, step 913 is performed to set the license transfer log's processing status field, thereby indicating that the write is completed. The process performed in step 576 in FIG. 6 is now completed.

Turning back to FIG. 6, the transfer destination becomes ready to receive a request from the host module 110 when the license is normally written into the license storage 333 (step 577). When the host module 110 transmits a write status confirmation request to the removable storage at the transfer destination (step 580), the removable storage at the transfer destination notifies the host module that the process is normally terminated (step 587). The host module then transmits a request for reading the encrypted content data (step 590 to step 591) and a request for transferring the recorded license to the license extractor 102 (step 592 to step 593) to the removable storages. In compliance with the above requests, removable storage 125 or 126 transmits the encrypted content data and license to the content decoder 111. A necessary decryption process is then performed so that a motion picture appears on the display 121.

If the user makes a request for playing back the next content data subsequently to the playback of the target content data, processing step 595 is performed. The process performed in step 595 is basically the same as that described with reference to FIGS. 5 through 9; however, it is different from the counterpart described with reference to FIGS. 5 through 9 because provision is made to reduce the processing load. The process performed in step 595 will now be described in detail with reference to FIGS. 5, 6, 10, 11, 12, and 13.

When a license is to be transferred after the preceding license has been transferred, a search is first conducted as described earlier to judge whether the target license exists at the transfer destination. This portion corresponds to processing steps 502 through 508. If the judgment result obtained in processing step 506 indicates that the target license does not exist at the transfer destination, the transfer destination undergoes a state transition and becomes ready to receive a license ID (step 538). In this instance, the transfer source informs the host module 110 that the transfer source does not possess the target license although it is not indicated in any figure. Since the authentication process is already completed for both the transfer source and destination, the program flow skips processing steps 507 through 537. After being informed from the transfer destination that the target license is not found, the host module 110 requests the transfer source to prepare the license ID for the license to be transmitted (step 545). The subsequent steps, including processing step 555 in which the transfer source receives the license ID and key type of the license to be received, are the same as described earlier. The processing steps to be performed subsequently to step 555 will be described with reference to FIGS. 10 through 13.

Figure 10:
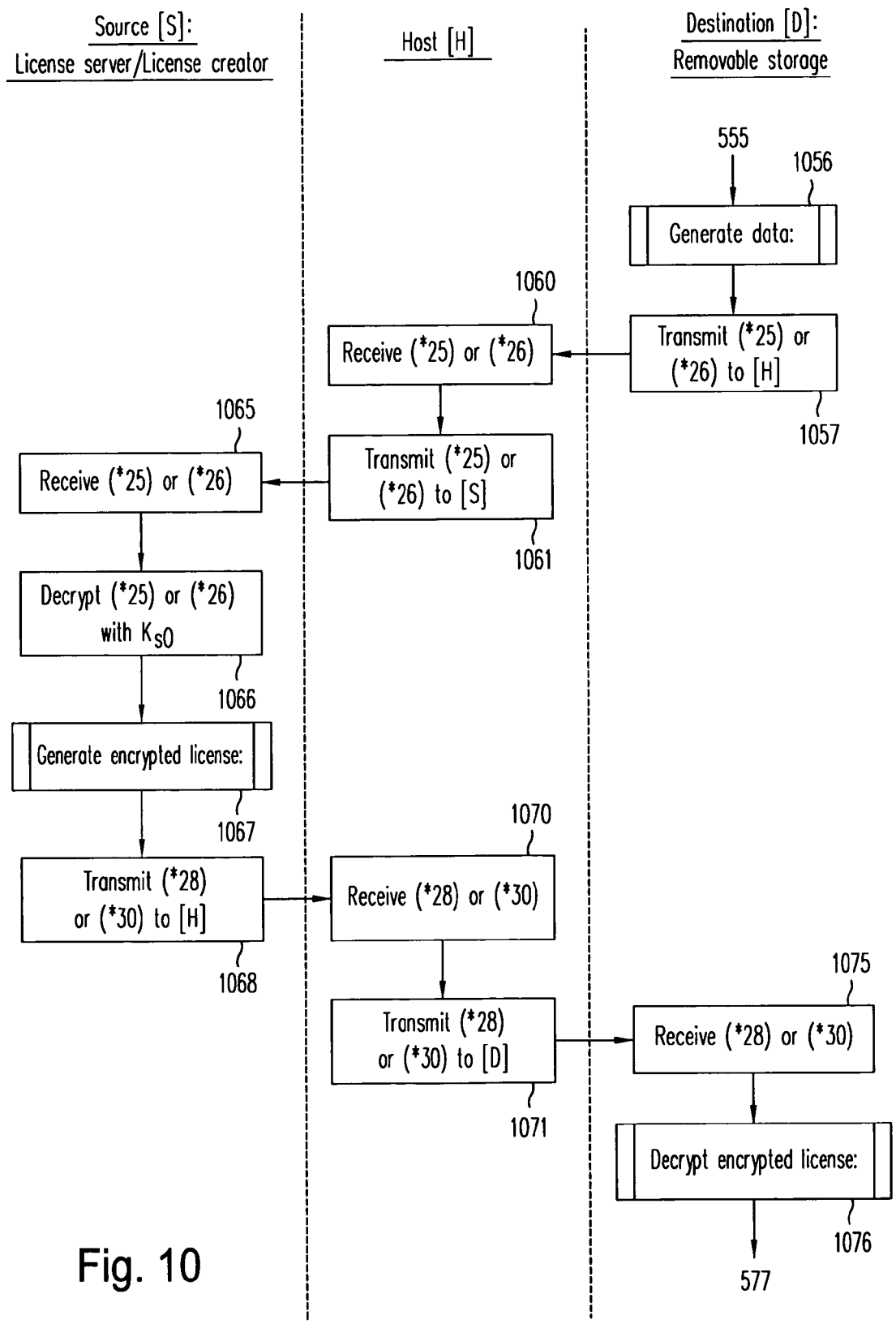
FIG. 10 is a flowchart illustrating the processes that the transfer source, the host module for controlling the processes during their execution, and the transfer destination perform to transfer a license from the transfer source to the transfer destination in the first embodiment of the data transfer system shown in FIG. 1.
Figure 11:
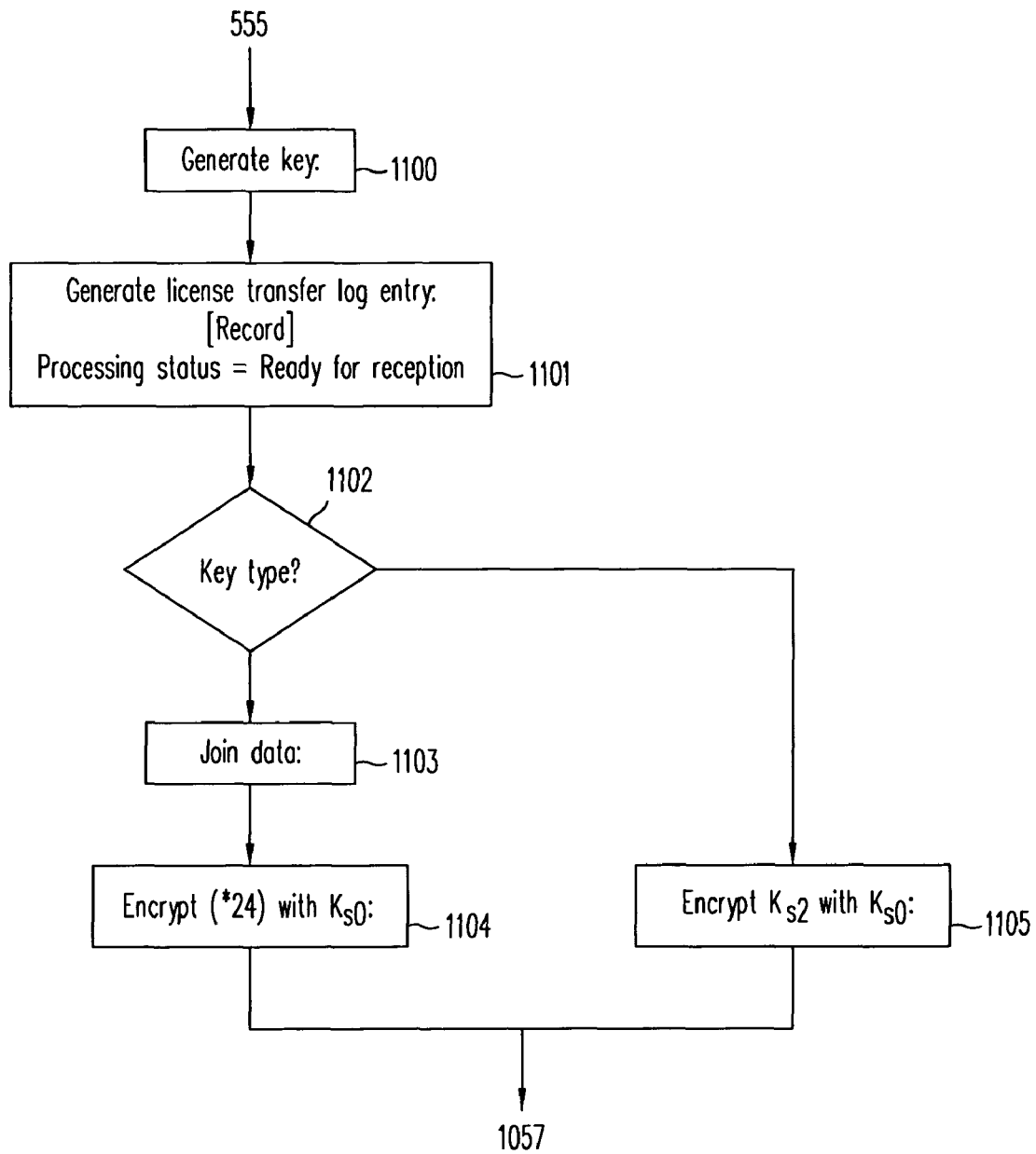
FIG. 11 is a flowchart illustrating the processes that the transfer source, the host module for controlling the processes during their execution, and the transfer destination perform to transfer a license from the transfer source to the transfer destination in the first embodiment of the data transfer system shown in FIG. 1.

When the transfer destination receives the above data in processing step 555, which is shown in FIG. 5, the program flow proceeds to processing step 1056, which is shown in FIG. 10. The process performed in step 1056 will now be described in detail with reference to FIG. 11. Upon receipt of data (*4), the transfer destination first generates the session time-variant key K_s2 (step 1100) and then generates a license transfer log entry as indicated in step 1101 of FIG. 11. The information to be recorded in the entry comprises the license ID for identifying the license to be transferred, the generated session time-variant key K_s2, and the processing status, which indicates that the preparation for reception is completed. Next, step 1102 is performed to note the key type transmitted from the transfer source and judge whether the session invariable key K_s0 or the transfer destination's device public key KP_d[D] should be used for license encryption. If the judgment result indicates that the transfer source's device public key KP_d[D] is required for license encryption, step 1103 is performed to join the session time-variant key K_s2 to the transfer destination's device public key KP_d[D], and then step 1104 is performed to encrypt the resulting joined data with the session invariable key K_s0. The data obtained in this manner is referred to as (*25).

If, on the other hand, the judgment result obtained in step 1102 indicates that the transfer destination's device public key KP_d[D] is not required for license encryption, step 1105 is performed to encrypt only the generated session time-variant key K_s2 with the session invariable key K_s0. The data obtained in this manner is referred to as (*26).

Turning back to FIG. 10, step 1057 is performed to transmit data (*25) or (*26), which is generated as described above, to the host module 110. The host module 110 receives the data and transmits it as it is to the transfer source (steps 1060 and 1061). The transfer source receives data (*25) or (*26) and decrypts it with the session invariable key K_s0 to obtain data (*24) or session time-variant key K_s2 (steps 1065 and 1066).

Figure 12:
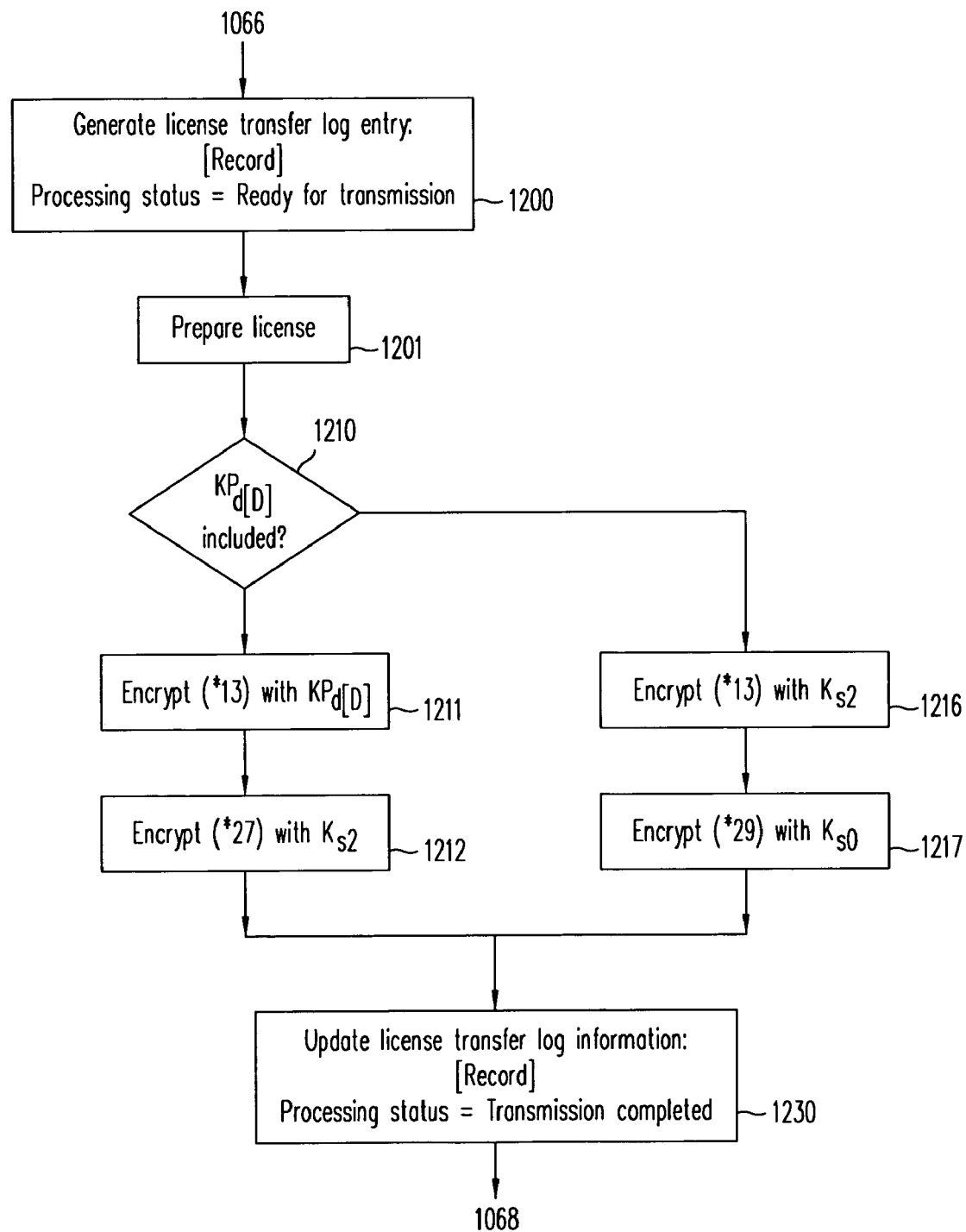
FIG. 12 is a flowchart illustrating the processes that the transfer source, the host module for controlling the processes during their execution, and the transfer destination perform to transfer a license from the transfer source to the transfer destination in the first embodiment of the data transfer system shown in FIG. 1.

The encrypted license generation process, which is subsequently performed in step 1067, will now be described in detail with reference to FIG. 12. As indicated in FIG. 12, the transfer source generates a license transfer log entry. The entry records the license ID of the license to be transferred, the session invariable key K_s0 that was used for decryption computation in processing step 1066, the session time-variant key K_s2 that was derived from the decryption process in step 1066, the transfer source's device public key KP_d[D], which is included only when it is included in the result of decryption, and the processing status, which indicates that the preparation for transmission is completed (step 1200). Next, step 1201 is performed to prepare the license to be actually transferred. The license preparation process is identical with the process performed in step 801. Therefore, the license data prepared in the process described above is the same as license data (*13).

Before the session invariable key K_s0 is shared, the issue date/time of the certificate invalidation list transmitted from the transfer destination is compared against that of the locally possessed certificate invalidation list. However, while the session time-variant key K_sn is shared, the above process is not performed. Therefore, processing step 1210 is performed to judge whether the received data ((*25) or (*26)) includes the transfer destination's device public key KP_d[D]. More specifically, processing step 1210 is performed to judge whether encryption needs to be performed with the transfer destination's device public key KP_d[D] before the target license is transmitted to the transfer destination. If the judgment result indicates that encryption is needed, the program flow proceeds to processing step 1211. If, on the other hand, the judgment result indicates that encryption is not needed, the program flow proceeds to processing step 1216. In processing steps 1211 and 1212, the license to be transferred is encrypted with the transfer destination's device public key KP_d[D] (processing step 1211; the resulting data is referred to as (*27)), and then encrypted with the device time-variant key (step 1212). The resulting data is referred to as (*28). In processing steps 1216 and 1217, on the other hand, the license is encrypted with the session time-variant key K_s2 (processing step 1216; the resulting data is referred to as (*29)), and then encrypted with the session invariable key K_s0 (step 1217). The resulting data is referred to as (*30).

When data (*28) or (*30) is generated as described above, the transfer source sets the processing status recording field of the license transfer log to indicate that transmission is completed (step 1230), and then proceeds to step 1068, which is shown in FIG. 10.

Turning back to FIG. 10, the transfer source transmits data (*28) or (*30), which has been generated as described above, to the host module 110 (step 1068). The host module receives either of the above two different encrypted licenses (step 1070), and then transmits it as it is to the transfer destination (step 1071). The transfer destination receives data (*28) or (*30) (step 1075), which has been transmitted from the host module, and then decrypts and records it in the license storage 333 in processing step 1076. The process performed in step 1076 will now be described in detail with reference to FIG. 13.

Figure 13:
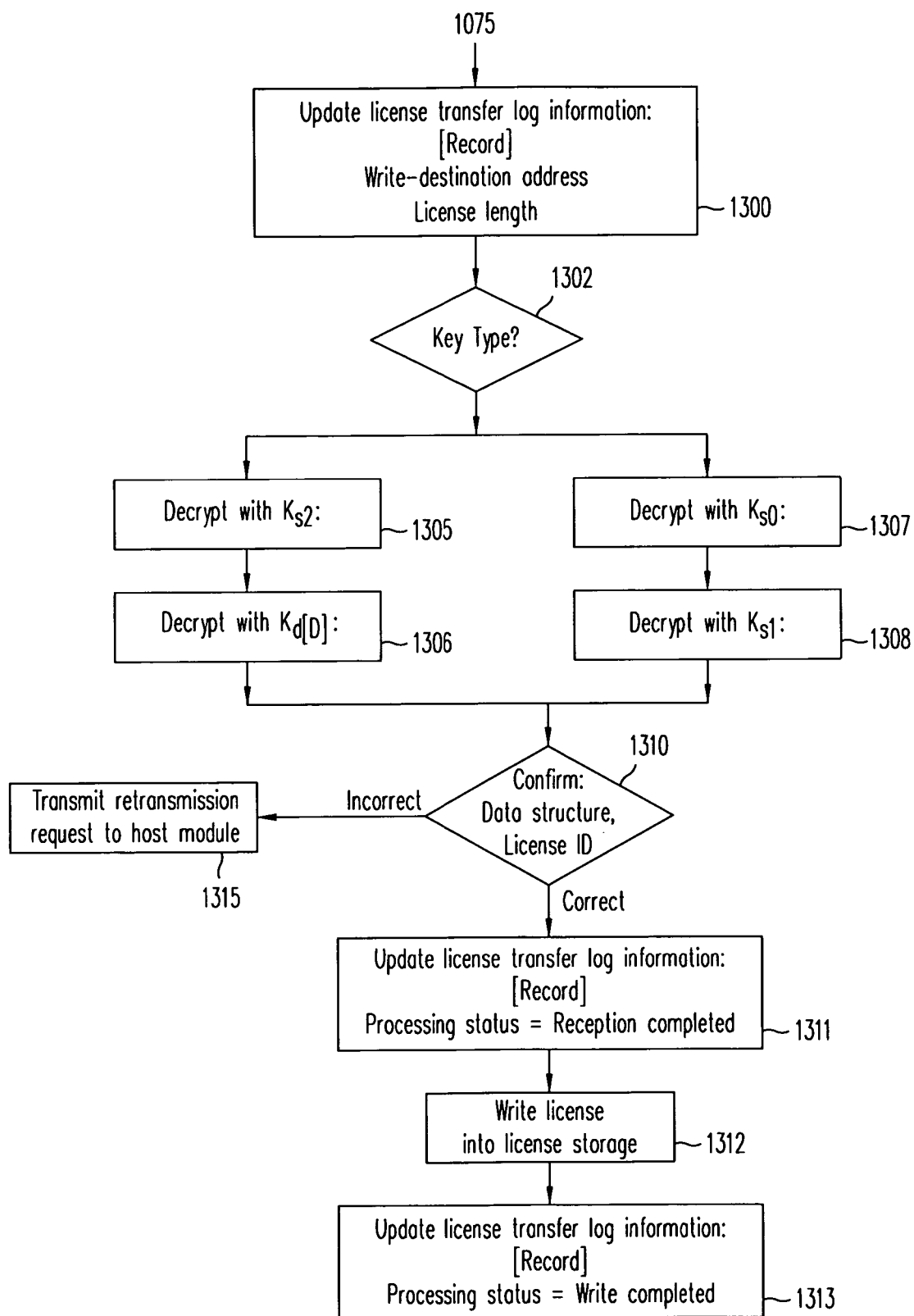
FIG. 13 is a flowchart illustrating the processes that the transfer source, the host module for controlling the processes during their execution, and the transfer destination perform to transfer a license from the transfer source to the transfer destination in the first embodiment of the data transfer system shown in FIG. 1.

As indicated in FIG. 13, the removable storage, which serves as the transfer destination, records the write-destination address of the designated license and the length of the encrypted license data to be transferred in a field of the license transfer log that was generated in processing step 1101 (step 1300), as is the case in FIG. 9. After termination of recording into the license transfer log, either the session time-variant key K_s2 (step 1305; the data derived from decryption is referred to as (*27)) or session invariable key K_s0 (step 1307; the data derived from decryption is referred to as (*29)) is used to achieve decryption depending on the type of the key data used for creating the received encrypted data (query step 1302). Subsequently, the result derived from decryption with the session time-variant key K_s2 is decrypted with the transfer destination device secret key K_d[D] (step 1306), whereas the result derived from decryption with the session invariable key K_s0 is decrypted with the session time-variant key K_s2 (step 1308). The data derived from these decryption processes is the license data main body (*13).

When the license data main body is completed, the transfer destination verifies the license structure (step 1310). If, for instance, the license ID and content ID are included in their proper forms, processing steps 1311 and beyond are performed. If the data structure is in error, the transfer destination transmits a request to the host module 110, thereby asking the host module 110 to retransmit the encrypted license (step 1315). If, on the other hand, the data structure is normal, step 1311 is performed to set the license transfer log's processing status field, thereby indicating that the reception is completed (step 1311). Step 1312 is then performed to write the license in the license storage 333. Subsequently, step 1313 is performed to set the license transfer log's processing status field, thereby indicating that the write is completed. The process performed in step 1076 in FIG. 10 is now completed.

Since the entire process shown in FIG. 10, that is, the process to be performed in step 576 in FIG. 6, is now completed, the program flow proceeds to processing steps 577 and beyond.

SECOND EMBODIMENT

A second embodiment of a data transfer system according to the present invention will now be described. The second embodiment is the same recorder/player as described in conjunction with the first embodiment and configured the same as indicated in FIGS. 1 through 3. However, the second embodiment of the data transfer system differs from the first embodiment in the configuration and operation of the license transfer manager in the removable storage. The internal structure of the license transfer manager, the data transmitted/received among the transfer source, host module, and transfer destination, and the procedures for transmitting/receiving the data will now be described.

Configuration of the License Transfer Manager in a Removable Storage

Figure 14:
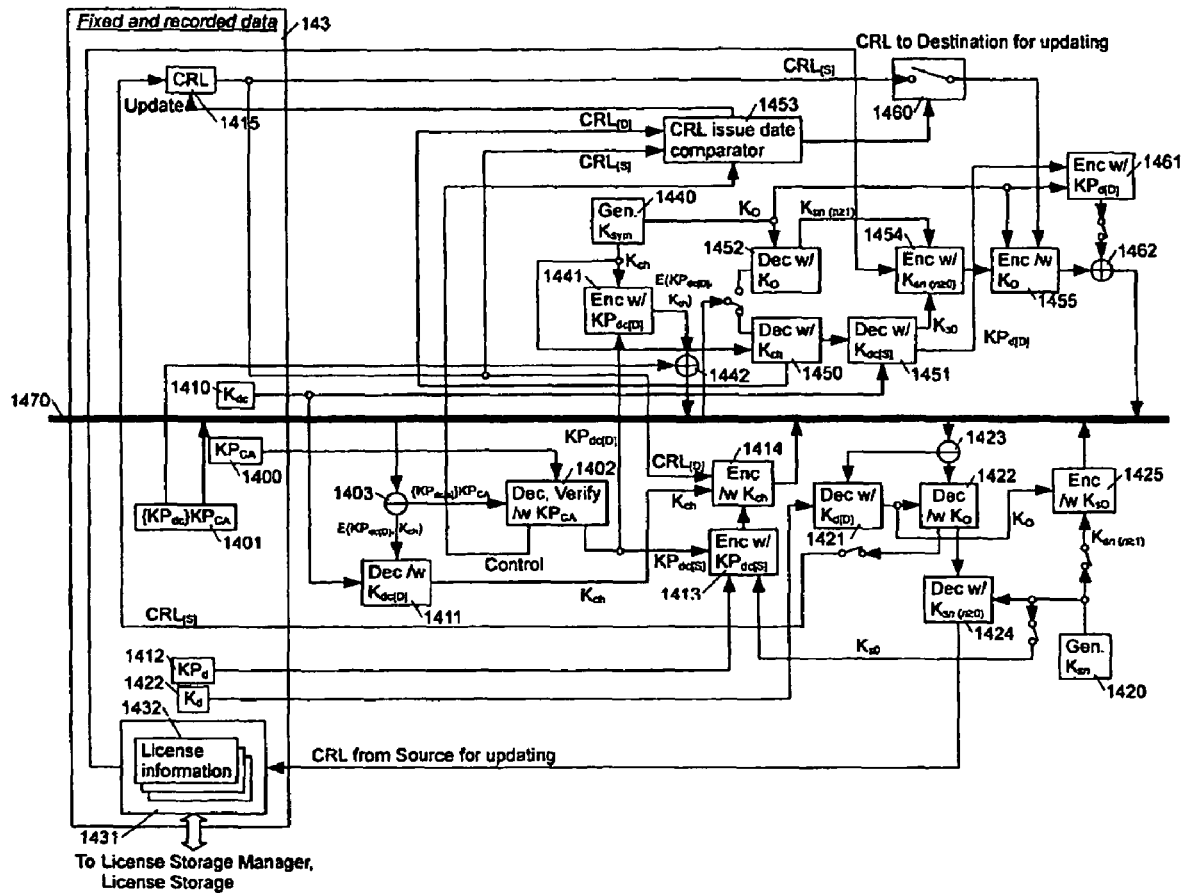
FIG. 14 illustrates in detail the internal configuration of a license transfer manager that is included in a removable storage of a data transfer system according to a second embodiment of the present invention.

FIG. 14 illustrates in detail the internal configuration of the license transfer manager, which is included in the removable storage of the data transfer system according to the present embodiment. As indicated in FIG. 14, a static storage area 1430 is provided in the license transfer manager. Embedded in the storage area 1430 are the certificate {KP_dc}KP_CA 401 concerning the device to which an electronic signature is given by the certification authority, the public key KP_CA (certification public key, 400) that is issued by the certification authority to decrypt the electronic signature in the certificate 1401, the public key KP_d (device public key, 1412) specific to the device, and the secret key K_d (device secret key, 412) for decrypting data that is encrypted with the device public key KP_d (1412). Further, a license temporary storage area 431 is provided to temporarily store a list of invalidated certificates (certificate invalidation list) 415 and a license read from the license storage 333 as rewritable information.

The recorder/player, license, system keys, and data configuration of the data transfer system according to the present embodiment are the same as described in conjunction with the first embodiment. However, all the session keys are constantly updated for each license transfer. Therefore, all the keys K_sn are referred to as a session time-variant key without regard to n. Instead, a session shell key K_so is generated and used at the transfer source. The roles to be played by the session shell key are similar to those played by the session invariable key that is described in conjunction with the first embodiment. The modules in which the session shell key is generated and the procedural position will be described later in detail.

Operation Performed in a License Write Process

The input/output operation relative to the license transfer manager is performed via a bus 1470. When a license is to be written into the license storage 333, the modules positioned below the bus 1470 in FIG. 14 are mainly used. These modules will now be sequentially described.

Module 1411 decrypts data that is encrypted with a device class public key KP_dc[D], which module 1411 transmitted to the transfer destination in the form of a certificate, with a corresponding device class secret key K_dc[D]. Module 1411 is designated Dec/w K_dc[D]. Its meaning is as described in conjunction with the first embodiment. Also, the meanings of the symbols [S] and [D] in the suffix and the transfer source and destination are as described in conjunction with the first embodiment.

Module 1402 verifies a certificate that includes a device class public key KP_dc[S] and is transmitted from the transfer source. The certification authority public key KP_CA (1400) is used for electronic signature verification. When the validity of the device class public key KP_dc[S] is verified, it is transmitted to module 1413.

Module 1413 joins a session time-variant key K_s0, which is generated by module 1420, to the device public key KP_d, which is embedded in module 1413, and then encrypts the joined data with the transfer source's device class public key KP_dc[S], which is transmitted from module 1402. K_s0 is generated by module 1420. Data that has been encrypted with the transfer source's device class public key KP_dc[S] is transmitted to module 1414. The encryption process to be performed by module 1413 need not be performed after the sharing of the session shell key K_so between the transfer source and destination is completed.

Module 1414 encrypts the data output from module 1413 with the challenge key K_ch, which is decrypted by module 1411 and output. This encryption process is performed after the certificate invalidation list recorded in module 1414 is joined to the data output from module 1413. The encrypted data is transmitted to the transfer source via the bus 1470 and interface 320.

The data in "E(K_so, E(K_sn, L)||CRL[S]||E(KP_d[D], K_so)" form enters module 1423 via the bus 1470. Module 1421 decrypts the latter half of the data separated by module 1423, that is, the session shell key K_so that is encrypted with the own device public key KP_d[D]. The session shell key K_so derived from decryption enters module 1422. Module 1422 uses K_so to decrypt the first half of the above-mentioned data, that is, E(K_so, E(K_sn, L)||CRL_[S]). CRL_[S] is transmitted when the issue date/time of the transfer source's certificate invalidation list is later than that of the transfer destination's certificate invalidation list. As the result of decryption with the session shell key K_so, when the transfer source's certificate invalidation list is included, the transfer source's certificate invalidation list overwrites the own certificate invalidation list. Meanwhile, data other than the certificate invalidation list decrypted by module 1422 is transmitted to module 1424 and decrypted with the session time-variant key K_s0. As a result of this decryption, the license transmitted from the transfer source is acquired. The acquired license is first stored in a license temporary storage area 1431 within the license transfer manager 321 and then recorded in the license storage 333.

Operation Performed in a License Read Process

When a license is to be read from the license storage 333, the modules positioned above the bus 470 in FIG. 14 are mainly used. These modules will now be sequentially described.

Module 1441 is capable of encrypting the challenge key K_ch generated by module 1440 with the device class public key KP_dc[D], which is transmitted from the transfer destination in the form of a certificate. The encrypted data is transmitted to the transfer destination via the bus 1470 and interface 320.

The challenge key K_ch generated by module 1440 also enters module 1450. Module 1450 uses the received challenge key K_ch to decrypt the data input from the bus 1470. However, the data transmitted from the bus 1470 enters either module 1450 or module 1452. The details will be given later with reference to FIG. 15 and beyond. In brief, if the session shell key K_so is still not shared by the transfer source and destination after mutual authentication is completed between the transfer source and destination, the data transmitted from the bus 1470 enters module 1450. If, on the other hand, the session shell key K_so is already shared, the data enters module 1452.

Module 1450 decrypts the data that is input from the bus 1470 by using the challenge key K_ch, and then inputs the decrypted data into module 1451. Module 1451 decrypts the input data with its own device class secret key 1410. However, the data output from module 1450 is not always encrypted at the transfer destination by using module 1450's own device class public key. Decryption occurs at the transfer destination only before the transfer source and destination share the session shell key K_so. After the session shell key K_so is shared, the process to be performed by module 1451 is not actually performed because no encryption is performed at the transfer destination by using the transfer source's device class public key. As regards the data acquired at module 1451 after decryption, the session time-variant key K_sn is transmitted to module 1454, and the transfer destination's device public key KP_d[D] is transmitted to module 1461.

Module 1454 uses the input session time-variant key K_sn to encrypt the license 1432. As regards the encrypted license, the output from module 1455 enters module 462 and becomes encrypted with the session shell key K_so. Prior to the encryption, however, module 1453 compares the issue date/time information about the certificate indicated in the transfer destination's certificate invalidation list, which is transmitted from the transfer destination, against the own issue date/time information. The transfer destination's certificate invalidation list is included in the output result of module 1450 (challenge key decryption result). If the comparison result indicates that the issue date/time of the own certificate invalidation list 1415 is earlier than that of the other, the transfer destination's certificate invalidation list overwrites the own certificate invalidation list 1415. If, on the contrary, the issue date/time of the transfer destination's certificate invalidation list is earlier than that of the other, the own certificate invalidation list 1415 is transmitted to module 1461. If the transfer destination does not transmit the certificate invalidation list, the transfer source does not transmit the certificate invalidation list.

Once the session shell key K_so is shared by the transfer source and destination, the data transmitted to the bus 1470 enters module 1452 as described above. Module 1452 decrypts the input data with the session shell key K_so. The output from module 1452 is always the session time-variant key K_sn(n ? 1). The acquired key data is transmitted to module 1454. The process performed by module 1454 is as described above.

Module 1461 is used to share the session shell key K_so. The session shell key K_so is generated by a common key generator 1440 as is the case with the challenge key K_ch, and then transmitted to module 1452 and module 1461. Module 1461 encrypts the session shell key K_so with the device public key KP_d[D] that is transmitted from the transfer destination. When module 1455 outputs the license that is encrypted with the session time-variant key K_sn and session shell key K_so, the output from module 1461 is joined to the output license and then transmitted to the bus 1470.

Configurations and Operations of the Distribution Server and Content Manager

The distribution server 150 and the content manager 101 are capable of generating and issuing a license. Therefore, the distribution server 150 and content manager 101 have internal modules required for a license write, which has been described above. However, the distribution server 150 and content manager 101 do not always need to have the license temporary storage area 1431 or license storage because they generate a license themselves. Instead, a license creator, which is capable of generating a license, is positioned in place of them. The configurations and operations of the distribution server and content manager are the same as described in conjunction with the first embodiment.

Content Decoder Configuration and Operation

The content decoder 111 is capable of decrypting content data and displaying it on the display 121. The content decrypter 103 is capable of decrypting encrypted content data and turning it into a motion picture data stream. The license extractor 102 transmits a key for decrypting encrypted content data to the content decrypter 103. The license extractor 102 performs a predetermined procedure for receiving an encrypted license, for instance, from the removable storages 125, 126, content manager 101, and distribution server 150. Therefore, the license extractor has a module necessary for performing the license read operation described above. A license transmitted from the transfer source is stored in the license temporary storage area 1431 and then transmitted to the content decrypter 103. The license transmitted from the transfer source in the above instance may be the entire license or the minimum information required for decrypting encrypted content data, that is, only a content key and UR_d for exercising control to determine whether or not to decrypt content data. In this instance, it is assumed that the host module knows the content ID of the content data to be decrypted, the content ID of the content data to which the license transmitted to the content decoder 111 corresponds, and the own license ID. The content decoder configuration and operation are the same as described in conjunction with the first embodiment.

Transfer Source-Host Module-Transfer Destination Processing Flow

The processes that are performed by the transfer source, the host module, which controls the processes during their execution, and the transfer destination for the purpose of transferring a license from the transfer source to the transfer destination will now be described with reference to FIGS. 15 through 18. The following description assumes that the license/content transfer destination is a removable storage and that the license transfer source is the content manager 101. However, the present invention is not limited to such a configuration.

Figure 15:
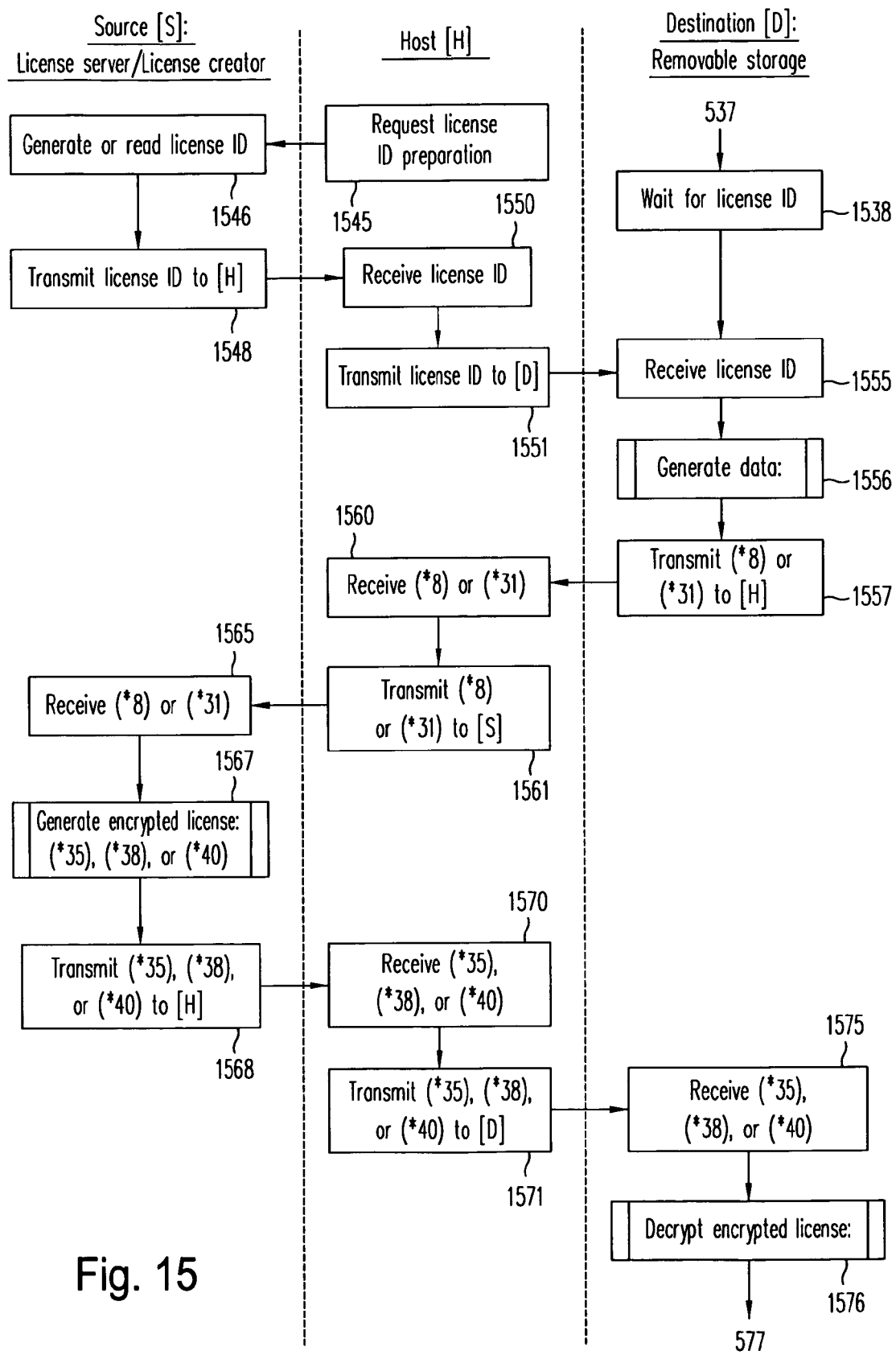
FIG. 15 is a flowchart illustrating the processes that the transfer source, the host module for controlling the processes during their execution, and the transfer destination perform to transfer a license from the transfer source to the transfer destination in the second embodiment of the data transfer system.

FIG. 15 does not illustrate the processing steps that are performed before the transfer destination waits for a license ID (step 1538). The reason is that such processing steps are the same as processing steps 500 through 537, which are shown in FIG. 5. When the transfer destination begins to wait for the license ID of the target license (step 1538) after processing step 537 is completed as indicated in FIG. 5, the host module 110 issues a request to the transfer source, thereby requesting the transfer source to generate a license ID or read it from the license storage 333 (step 1545). In compliance with the request, the transfer source generates or reads the target license (step 1546). When such a generation or read process terminates, the transfer source transmits the prepared license ID to the host module 110 (step 1548). The host module 110 receives the license ID (step 1550) and then transmits it as it is to the transfer destination (step 1551). The transfer destination receives the license ID (step 1555) and then generates certain data, which is encrypted with the previously received challenge key K_ch (step 1556). The process performed in step 1556 will now be described in detail with reference to FIG. 16.

Figure 16:
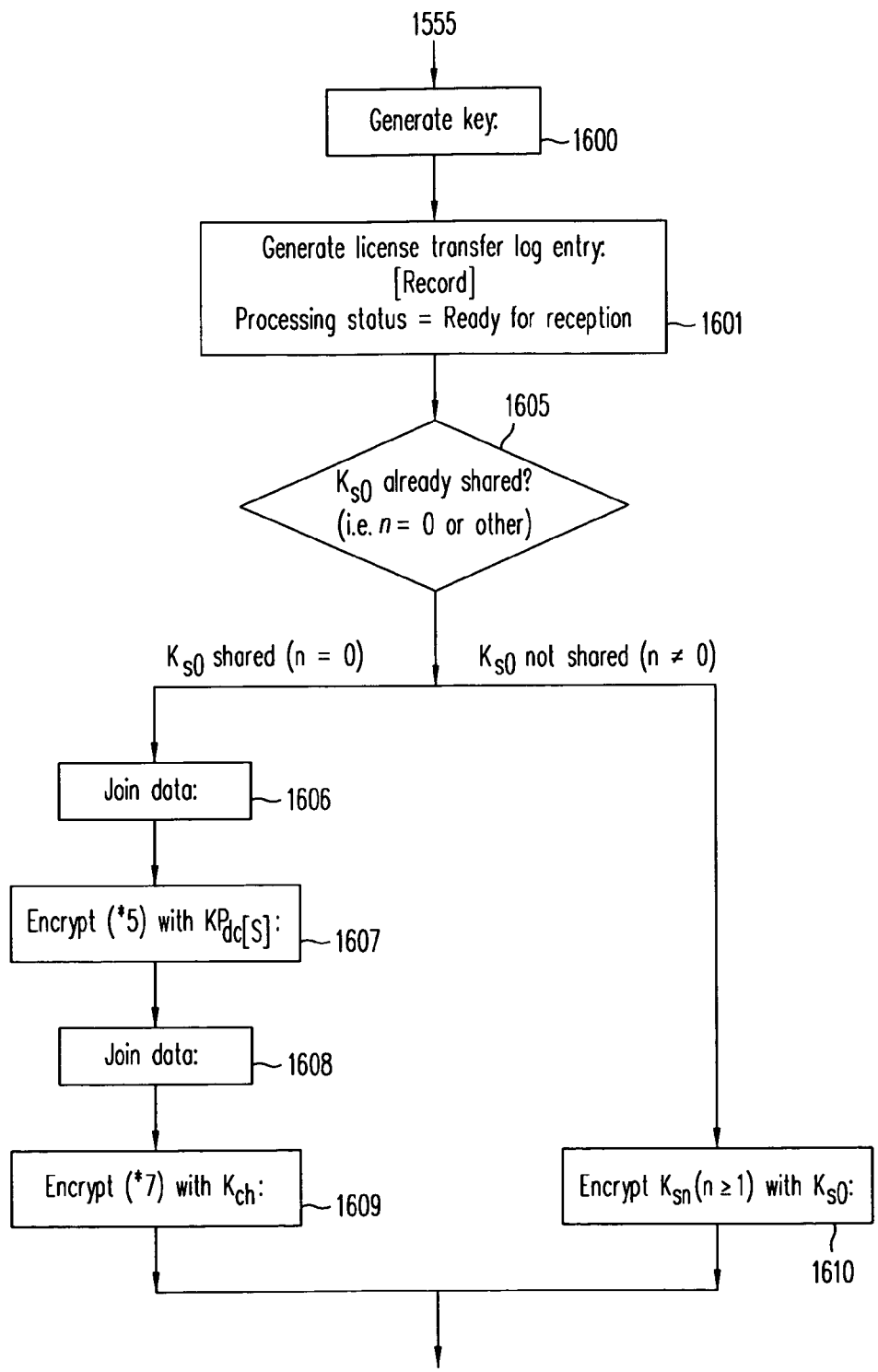
FIG. 16 is a flowchart illustrating the processes that the transfer source, the host module for controlling the processes during their execution, and the transfer destination perform to transfer a license from the transfer source to the transfer destination in the second embodiment of the data transfer system.

Upon receipt of the license ID, the transfer destination first generates a session time-variant key K_sn (step 1600) as indicated in FIG. 16. If the transfer source and destination did not share the session shell key K_so in the past, it is assumed that n=0. The value n is incremented by one whenever the session time-variant key is generated for a subsequently performed license transfer process.

Next, a transfer log entry is generated to prevent the license from disappearing from both the transfer source and destination when a license transfer is not normally completed. At this stage, the entry is generated to record the license ID for identifying the license to be transferred, the generated session time-variant key K_sn, and the processing status information for indicating that the preparation for reception is completed (step 1601).

After the transfer log recording process is terminated, step 1605 is performed to judge whether the transfer source and destination shared the session shell key K_so in the past. The method for sharing the session shell key will be described later. The fact that the session time-variant key is generated while the session shell key K_so is not shared means that there is no generation number for the session time-variant key. If the session shell key K_so is not shared, step 1606 is performed to generate data (*5), which is obtained by joining the previously generated session time-variant key K_s0 to the device public key KP_d[D]. Data (*5) is first encrypted with KP_dc[D], which is included in the certificate transmitted from the transfer source (step 1607). The resulting encrypted data is (*6) because it is the same as that obtained in processing step 707, which is shown in FIG. 7. As a result of such encryption, the transfer source module cannot decrypt data (*6) even when it receives data (*6) unless it possess at least a secret key K_dc[S] for the device class public key KP_dc[S] contained in the certificate. Therefore, even when the certificate transmitted from the transfer source does not agree with the module that actually attempts to transfer the license, the module cannot acquire the key if it does not have a device class secret key authorized at least by the certification authority. Consequently, the transfer destination can reject a license transfer from a transfer source that is not authorized by the certification authority.

Next, the own certificate invalidation list is joined to data (*6) in step 1608 to create data. This processing step is identical with step 708 in FIG. 7. Therefore, the created data is (*7). Data (*7) is then encrypted with the previously decrypted challenge key K_ch. The resulting data, which is encrypted with the challenge key K_ch in step 1609, is (*8) (as is the case in processing step 709, which is shown in FIG. 7).

If the transfer source and destination shared the session shell key K_so in the past, the session time-variant key generated in processing step 1600 is first encrypted with the session shell key K_so (step 1610). The resulting data is referred to as (*31).

Turning back to FIG. 15, data (*8) or data (*31), which has been generated as described above, is transmitted to the host module 110 (step 1557). The host module 110 receives the data (step 1560), and transmits it as it is to the transfer source (step 1561). The transfer source receives data (*8) or (*31) (step 1565), decrypts it with the challenge key K_ch or session shell key K_so, which has been locally generated, and generates an encrypted license (step 1567). The process performed in step 1567 will now be described in detail with reference to FIG. 17.

Figure 17A:
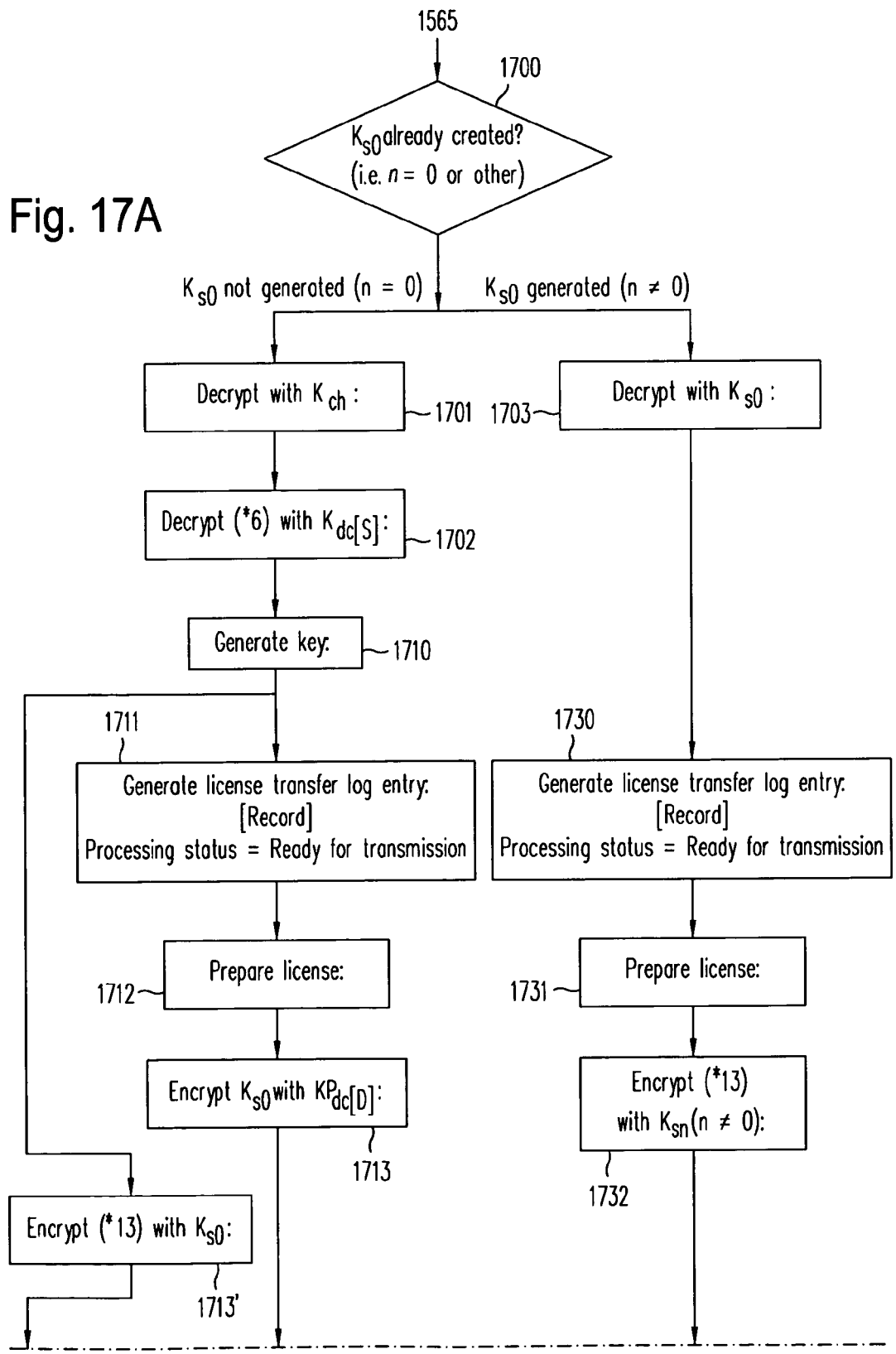
FIG. 17 is a flowchart illustrating the processes that the transfer source, the host module for controlling the processes during their execution, and the transfer destination perform to transfer a license from the transfer source to the transfer destination in the second embodiment of the data transfer system.
Figure 17B:
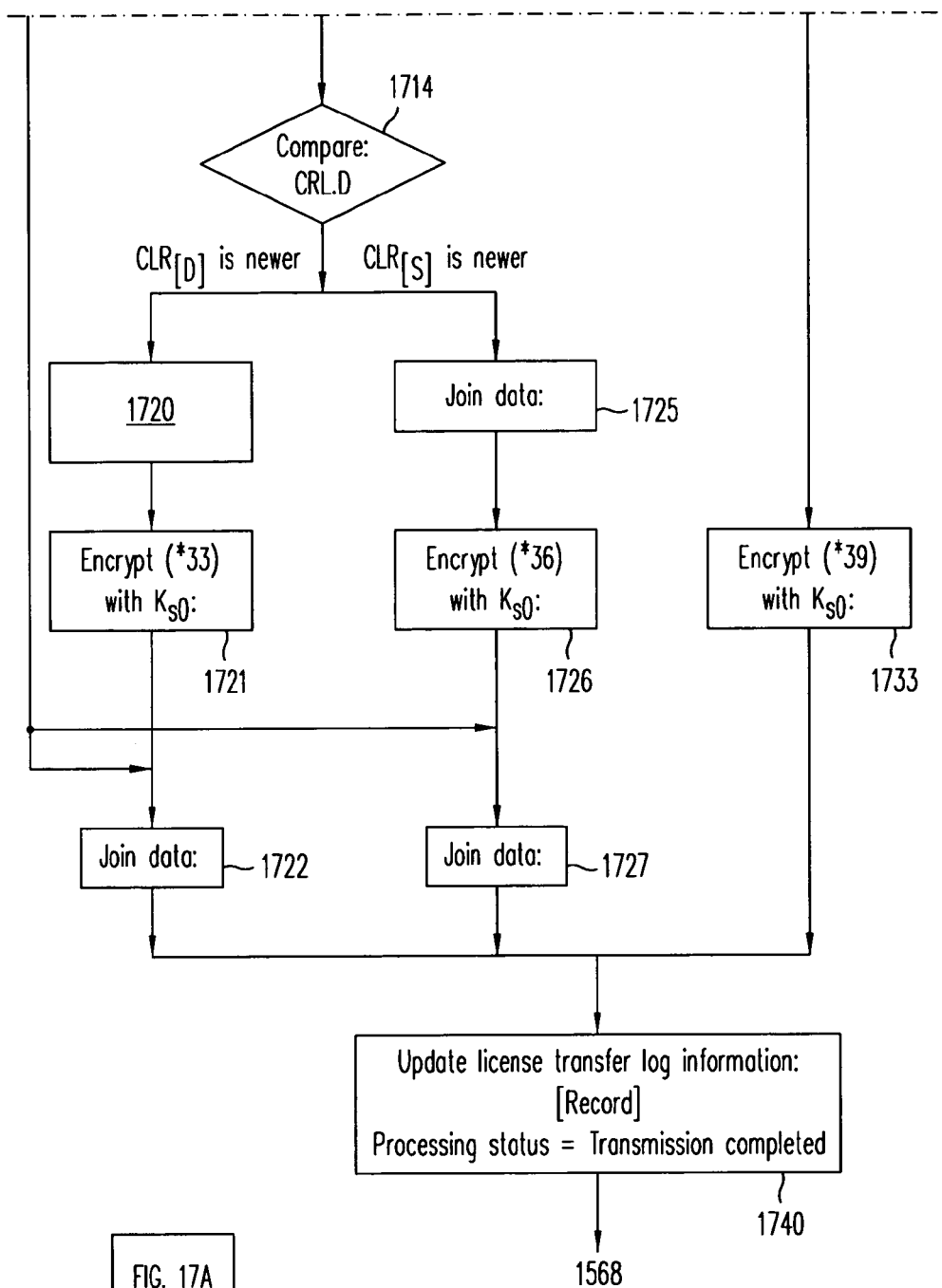

As indicated in FIG. 17, step 1700 is first performed to judge whether the session shell key was generated in the past. If the session shell key was not generated in the past, the received data must be encrypted with the challenge key and is therefore decrypted with the challenge key (step 1701). As a result of decryption, data (*7) is obtained. Data (*7) includes the transfer destination's certificate invalidation list. However, the other data is encrypted with the own device class public key KP_dc[S]. The data encrypted with the own device class public key KP_dc[S] is decrypted with the own device class secret key K_dc[S] (step 1702). Therefore, data (*5) is obtained as a result of decryption.

After termination of the above decryption process, step 1710 is performed to generate the session shell key K_so. Next, step 1711 is performed to generate a license transfer log entry. The generated log records the license ID of the license to be transmitted, the session shell key K_so, the session time-variant key K_s0, the transfer destination's device public key KP_d[D], and the processing status, which indicates that the preparation for transmission is completed (step 1711).

After the license transfer log recording process is terminated, step 1712 is performed to prepare the license that is to be actually transferred. The license data to be prepared is (*13) (as is the case in processing step 801). License data (*13) is encrypted with the session time-variant key K_s0 that is transmitted from the transfer destination (step 1713). As a result of encryption, data (*33) is obtained.

While the license transfer log entry is generated and the license to be transmitted is prepared, step 1713 is performed to encrypt the generated session shell key K_so with the transfer destination device public key KP_d[D]. As a result of encryption, data (*32) is obtained.

After termination of license preparation, the issue date/time of the certificate invalidation list CRL_[D] transmitted from the transfer source is compared against the issue date/time of the certificate invalidation list that is locally possessed by the transfer source (step 1714). It is assumed that the issue date/time is indicated in the certificate invalidation lists. If the comparison result indicates that the issue date/time of the own certificate invalidation list is later than that of the other, processing steps 1720 and beyond will be performed. If, on the other hand, the issue date/time of the transfer destination's certificate invalidation list is later than that of the other, processing steps 1725 and beyond will be performed.

In processing step 1720, the transfer destination's certificate invalidation list overwrites the own certificate invalidation list. Next, the license (*33) encrypted with the session time-variant key K_s0 is encrypted with the previously generated session shell key K_so to generate data (*34) (step 1721). When data (*34) is generated, data (*32) is joined to data (*34) to generate data (*35) (step 1722) so that the license can be decrypted at the transfer destination.

Meanwhile, in processing step 1725, the locally possessed certificate invalidation list is joined to the license (*33) encrypted with the session time-variant key K_s0 in order to update the transfer destination's certificate invalidation list. The resulting data is referred to as (*36). Data (*36) is then encrypted with the session shell key K_so (step 1726; the resulting data is (*37)) as is the case in processing step 1721. Next, data (*32) is joined to data (*37) (step 1727; the resulting data is (*38)) as is the case in processing step 1722.

If the session shell key K_so was already generated in the past, the received data is encrypted with the session shell key K_so. Therefore, decryption is performed with the session shell key K_so. The data obtained as a result of decryption is the session time-variant key K_sn(n ? 1) that is newly generated at the transfer destination. Subsequently to processing step 1703, processing steps 1730, 1731, 1732, and 1733 are sequentially performed. Processing step 1730 is performed, as is the case in processing step 1711, to generate and record a license transfer log entry. Processing step 1731 is performed to prepare the license data. Processing step 1732 is performed to encrypt the prepared license data with the session time-variant key K_sn(n ? 1). In processing step 1733, the license data encrypted with the session time-variant key K_sn(n ? 1) is doubly encrypted with the session shell key K_so. The data recorded in the license transfer log in processing step 1730 comprises the license ID for identifying the license to be transferred, the session shell key K_so, session time-variant key K_sn(n ? 1), and the processing status, which indicates that the preparation for transmission is completed. The data encrypted with the session time-variant key K_sn(n ? 1) is referred to as (*39). The data doubly encrypted with the session shell key K_so is referred to as (*40).

When data (*35), (*38), or (*40) is generated, the transfer source sets the license transfer log's processing status recording field to indicate that transmission is completed (step 1740), and then proceeds to step 1568, which is shown in FIG. 15.

Turning back to FIG. 15, the transfer source transmits data (*35), (*38), or (*40), which has been generated as described above, to the host module 110 (step 1568). The host module 110 receives one of the above-mentioned three different encrypted license data (step 1570), and then transmits it as it is to the transfer destination (step 1571). The transfer destination receives data (*35), (*38), or (*40), which has been transmitted from the host module 110 (step 1575), and then performs processing step 1576, in which the license derived from decryption is recorded in the license storage 333. The process performed in step 1576 will now be described with reference to FIG. 18.

Figure 18A:
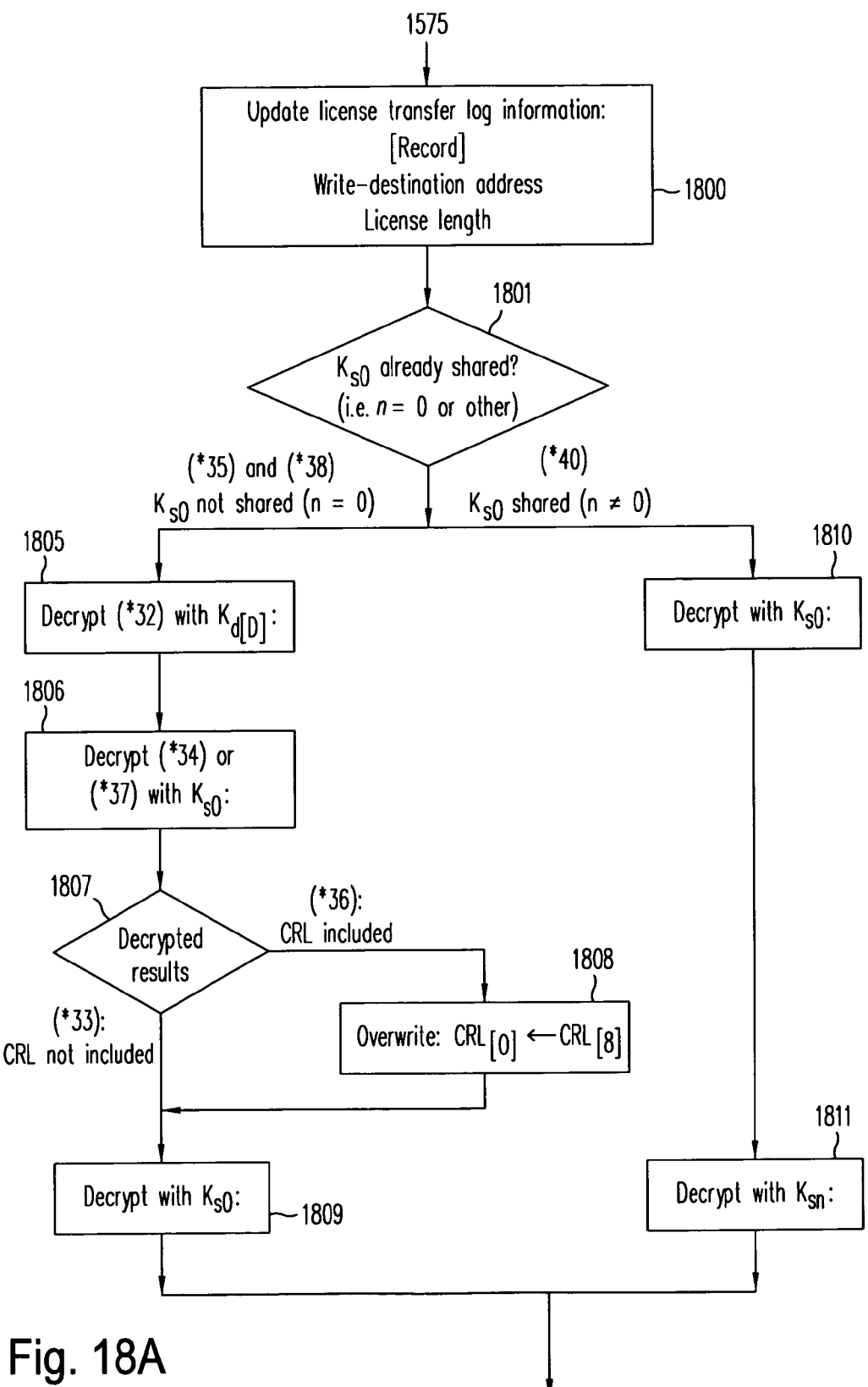
FIG. 18 is a flowchart illustrating the processes that the transfer source, the host module for controlling the processes during their execution, and the transfer destination perform to transfer a license from the transfer source to the transfer destination in the second embodiment of the data transfer system.
Figure 18B:
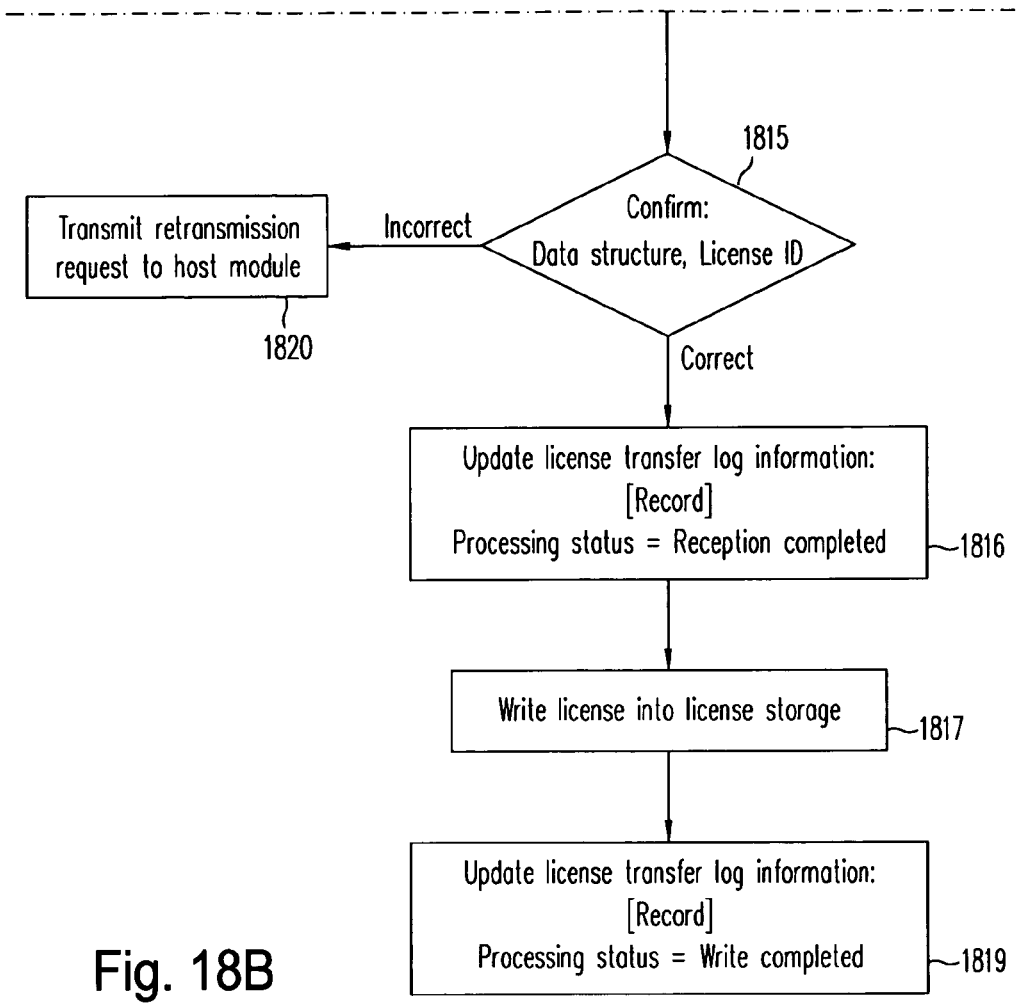
Figure 18:
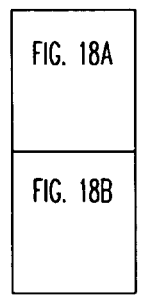

As indicated in FIG. 18, the transfer destination first records an address that is designated by the host module (particularly external storage interface 105 or 106) as the license write destination and the length of the data to be transferred in a single field of the license transfer log that was generated in processing step 1601 (step 1800). Next, the transfer destination performs step 1801 to judge whether the session shell key K_so is shared. If the session shell key K_so is not shared yet, the transfer destination performs processing step 1805 and beyond. If the session shell key K_so is already shared, the transfer destination performs processing step 1810 and beyond.

In processing step 1805, a part (*32) of the received data is decrypted with the own device secret key K_d[D]. As a result, the session shell key K_so is obtained. The remaining portion of the received data, namely, data (*34) or (*37), is then decrypted with the session shell key K_so in step 1806. If the remaining data is (*37), it includes the transfer source's certificate invalidation list, which is newer than the locally possessed certificate invalidation list (step 1807). Therefore, the transfer source's certificate invalidation list overwrites the own certificate invalidation list (step 1808). After the certificate invalidation list is updated in the above manner, the license data is decrypted with the session time-variant key K_s0 (step 1809) to acquire license data (*13).

If the session shell key K_so is already shared, the received data is (*40); therefore, it is directly decrypted with the session shell key K_so to acquire data (*39) in step 1810. Next, data (*39) is decrypted with the session time-variant key K_sn(n ? 1) to acquire the license data main body (*13) in step 1811.

After the license data is completely converted into plain text, the transfer destination verifies the structure of the license in step 1815. If the license ID, content ID, and other data are included in properly formats, the transfer destination performs processing step 1816 and beyond. If the data structure is in error, the transfer destination requests the host module 110 to retransmit the encrypted license (step 1820). If, on the other hand, the data structure is normal, the transfer destination sets the license transfer log's processing status field to indicate that reception is completed (step 1816), writes the license into the license storage 333 (step 1817), and changes the license transfer log's processing status field to indicate that a write is completed (step 1819). The process to be performed in step 1576, which is shown in FIG. 15, is now completed.

The entire process shown in FIG. 15, that is, the process to be performed in step 576 in FIG. 6, is now completed. Therefore, processing steps 577 and beyond will be performed subsequently.

Figure 19:
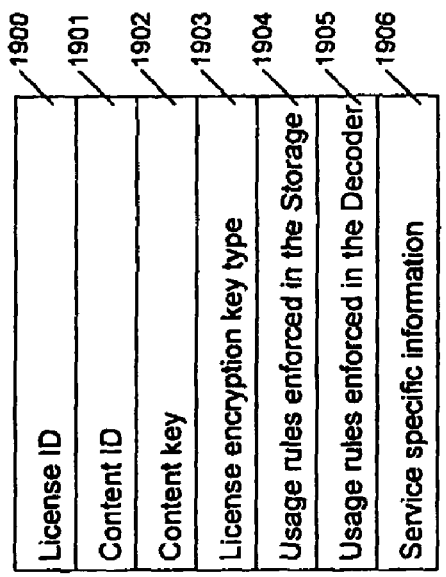
FIG. 19 illustrates a typical license data structure that is used in the data transfer system according to the present invention.

FIG. 19 shows a typical license data structure that is used in the first and second embodiments of the data transfer system according to the present invention.

Other Embodiments

The other embodiments of the data transfer system and data transfer method according to the present invention will now be illustratively enumerated.

(1) A method for transferring a license, which comprises encrypted content data, key data for decrypting the content data, and decryption permission condition data, from one module to another, the method comprising the steps of causing a transfer destination to transmit a certificate, which includes a transfer destination's device class public key, to a transfer source; causing the transfer source to verify the validity of the received certificate, generate a challenge key when the verification result indicates that the received certificate is valid, encrypt the challenge key with the received device class public key, join the generated encrypted data to a certificate, which includes own device class public key, transmit the resulting joined data to the transfer destination; causing the transfer destination, which has received the joined data, to decrypt the data with own device class secret key and acquire the challenge key; causing the transfer source to join a license ID for identifying the license to a key for license encryption (which is referred to as a key type), and transmit the resulting joined data; causing the transfer destination to generate a first session key and second session key or only the first session key in accordance with the received key type, join the first session key to the transfer destination's own device public key or join the first session key to the second session key in accordance with the key type, encrypt the joined data with the received device class public key of the transfer source, join either of the two pieces of generated encrypted data to own certificate invalidation list, encrypt the resulting joined data with the challenge key, and transmit the resulting encrypted data to the transfer source; causing the transfer source to receive the data transmitted from the transfer destination, decrypt the received data with the challenge key, note the data derived from decryption, compare list issue date/time information indicated in the transfer destination's certificate invalidation list against list issue date/time information indicated in the locally possessed certificate invalidation list, overwrite the own certificate invalidation list with the received transfer destination's certificate invalidation list if the issue date/time of the own certificate invalidation list is earlier while decrypting the data derived from decryption excluding the transfer destination's certificate invalidation list with the own device class secret key, acquire the joined first session key and second session key or the joined first session key and transfer destination's device public key, encrypt the license with the acquired second session key or transfer destination's device public key, join the own certificate invalidation list to the created encrypted data only when the result of certificate invalidation issue date/time comparison indicates that the issue date/time of the own certificate invalidation list is later than that of the other, encrypt the resulting data with the first session key, and transmit the resulting encrypted data to the transfer destination; and causing the transfer destination to decrypt the received data with corresponding keys, and record the license in the own tamper-proof area.

(2) The data transfer method according to (1) above, wherein, when the license is to be transferred while the first session key shared by the transfer source and destination is retained between the transfer source and destination, and when the license to be transferred does not make a request for encryption with the transfer destination's device public key, the method comprises the steps of causing the transfer destination to generate a new session key, encrypt the session key with the first session key, and transmit the resulting encrypted data to the transfer source; and causing the transfer source to receive the data transmitted from the transfer destination, acquire a new session key by decrypting the received data with the first session key, encrypt the license to be transferred with the acquired new session key, encrypt the resulting encrypted data with the first session key, and transmit the resulting encrypted data to the transfer destination.

(3) The data transfer method according to (1) above, wherein, the encryption/decryption method required for an individual license transmission is prescribed in a format in which a key type 1903 is indicated in a field for an individual license.

(4) A method for transferring a license, which comprises encrypted content data, key data for decrypting the content data, and decryption permission condition data, from one module to another, the method comprising the steps of causing a transfer destination to transmit a certificate, which includes a transfer destination's device class public key, to a transfer source; causing the transfer source to verify the validity of the received certificate, generate a challenge key for its temporary common key encryption when the verification result indicates that the received certificate is valid, encrypt the challenge key with the received device class public key, join the generated encrypted data to a certificate, which includes own device class public key, transmit the resulting joined data to the transfer destination; causing the transfer destination, which has received the joined data, to decrypt the data with own device class secret key, acquire the challenge key, and transmit the license ID for identifying the license; causing the transfer destination to generate a first session key, join the generated first session key to the device public key possessed by the transfer destination, encrypt the resulting joined data with the received transfer source's device class public key, join the generated encrypted data to a certificate invalidation list, encrypt the resulting joined data with the challenge key, and transmit the resulting encrypted data to the transfer source; causing the transfer source to receive the data transmitted from the transfer destination, decrypt the received data with the challenge key, note the transfer destination's certificate invalidation list that is included in the data derived from decryption, compare issue date/time information about the list, which is provided in the list, against issue date/time information about the own certificate invalidation list, which is provided in the locally possessed certificate invalidation list, overwrite the own certificate invalidation list with the received transfer destination's certificate invalidation list if the issue date/time of the own certificate invalidation list is earlier while decrypting the data derived from decryption excluding the transfer destination's certificate invalidation list with the own device class secret key, acquire the joined first session key and transfer destination's device public key, encrypt the license with the acquired first session key, join the own certificate invalidation list to the created encrypted data only when the result of certificate invalidation issue date/time comparison indicates that the issue date/time of the own certificate invalidation list is later than that of the other, generate a session shell key, which is a new temporary key, encrypt the encrypted license and the certificate invalidation list joined to the encrypted license with the generated session shell key, encrypt the generated session shell key with the previously acquired transfer destination's device public key, join the two pieces of data that have been acquired in the above process, and transmit the joined data to the transfer destination; causing the transfer destination to decrypt the received data with corresponding keys and record the license in the own tamperproof area.

(5) The data transfer method according to (4) above, wherein, when the license is to be transferred while the session shell key shared by the transfer source and destination is retained between the transfer source and destination, the method comprises the steps of causing the transfer destination to generate a new session key, encrypt the session key with the session shell key, and transmit the resulting encrypted data to the transfer source; and causing the transfer source to receive the transmitted data, decrypt the received data with the session shell key, acquire a new session key, encrypt the license to be transferred with the acquired new session key, encrypt the license with the session shell key, and transmit the encrypted license to the transfer destination.

(6) A license transfer manager 321 comprising module 411, which is implanted with an electronically signed device class public key, a device class secret key corresponding to the electronically signed device class public key, a public key issued by the certification authority, a device public key, and a device secret key corresponding to the device public key for the purpose of receiving and recording a license transmitted by the data transfer method according to (1), (2), or (3) above, and capable of receiving data via the bus 470 and decrypting the received data with the own device class secret key; module 402, which verifies the data received via the bus 470 with the public key issued by the certification authority; module 420, which generates the session invariable key and session time-variant key; module 413, which selects either the session time-variant key or the locally embedded device public key, joins the selected key to the session invariable key, and encrypts the resulting joined data with the transfer source's device class public key; module 414, which joins the own certificate invalidation list to the output from module 413, encrypts the resulting joined data with the challenge key transmitted from the transfer source, and transmits the resulting encrypted data to the bus 470; module 421, which receives data via the bus 470 and decrypts the received data with the session time-variant key; module 422, which receives data via the bus 470 and decrypts the received data with the session invariable key; module 415, which acquires the transfer source's certificate invalidation list from the output of module 421 or module 422 and overwrites the transfer source's certificate invalidation list with the own certificate invalidation list; module 423, which decrypts the data output from module 421, excluding the certificate invalidation list data, with the own device secret key; module 424, which decrypts the data output from module 422, excluding the certificate invalidation list data, with the own session time-variant key; module 425, which encrypts the session time-variant key generated by module 420 with the session invariable key; and module 431, which is capable of temporarily storing the nonencrypted license output from module 423 or module 424 and recording the nonencrypted license in the license storage 333.

(7) A license transfer manager 321 comprising module 411, which is implanted with an electronically signed device class public key, a device class secret key corresponding to the electronically signed device class public key, a public key issued by the certification authority, a device public key, and a device secret key corresponding to the device public key for the purpose of transmitting a license by the data transfer method according to (1), (2), or (3) above, and capable of receiving data via the bus 470 and decrypting the received data with the own device class secret key; module 402, which verifies the data received via the bus 470 with the public key issued by the certification authority; module 440, which generates a challenge key; module 441, which encrypts the generated challenge key with the device class public key that is transmitted in certificate form from the transfer destination; module 442, which joins the output from module 441 to the own certificate including the device class public key; module 450, which decrypts the data received via the bus 470 with the challenge key; module 452, which decrypts the data received via the bus 470 with the session time-variant key; module 453, which notes the data derived from decryption by module 450, compares the issue date/time of the certificate invalidation list transmitted from the transfer destination against that of the own certificate invalidation list, and controls a switch 460 for determining whether or not to transmit the own certificate invalidation list to the transfer destination; module 451, which decrypts the data derived from decryption by module 450, excluding the certificate invalidation list data, with the own device class secret key; module 431, which reads the license recorded in the own license storage 333 and temporarily stores the read license; module 454, which encrypts the license acquired from module 431 with the session time-variant key; module 455, which encrypts the license acquired from module 431 with the transfer destination's device public key; module 461, which joins the own certificate invalidation list to the output of module 454 when the switch 460 is ON, encrypts the resulting joined data with the session invariable key, and transmits the resulting encrypted data to the bus 470; and module 462, which joins the own certificate invalidation list to the output of module 455 when the switch 460 is ON, encrypts the resulting joined data with the session invariable key, and transmits the resulting encrypted data to the bus 470.

(8) A license transfer manager 321 comprising module 1411, which is implanted with an electronically signed device class public key, a device class secret key corresponding to the electronically signed device class public key, a public key issued by the certification authority, a device public key, and a device secret key corresponding to the device public key for the purpose of receiving and recording a license transmitted by the data transfer method according to (4) or (5) above, and capable of receiving data via the bus 470 and decrypting the received data with the own device class secret key; module 1402, which verifies the data received via the bus 470 with the public key issued by the certification authority; module 1420, which generates the session invariable key; module 1413, which joins the session time-variant key to the own device public key and encrypts the resulting joined data with the transfer source's device class public key; module 1414, which joins the own certificate invalidation list to the output from module 1413, encrypts the resulting joined data with the challenge key transmitted from the transfer source, and transmits the resulting encrypted data to the bus 470; module 1423, which receives data via the bus 470, separates the received data into the data encrypted with the own device public key and the other data, and transmits the resulting separated data to module 1421 and module 1422; module 1421, which receives the data transmitted from module 1423 and decrypts the received data with the own device secret key; module 1422, which receives the session shell key that is output from module 1421, and uses the received session shell key to decrypt the data transmitted from module 1423; module 1415, which acquires the transfer source's certificate invalidation list from the data derived from decryption by module 1422 and overwrites the own certificate invalidation list with the acquired transfer source's certificate invalidation list; module 1425, which encrypts the session time-variant key generated by module 1420 with the session shell key and transmits the resulting encrypted data to the bus 470; and module 1431, which is capable of acquiring the nonencrypted license from the data derived from decryption by module 1422, temporarily storing the nonencrypted license, and recording the nonencrypted license in the tamperproof license storage 333.

(9) A license transfer manager 321 comprising module 1411, which is implanted with an electronically signed device class public key, a device class secret key corresponding to the electronically signed device class public key, a public key issued by the certification authority, a device public key, and a device secret key corresponding to the device public key for the purpose of transmitting a license by the data transfer method according to (4) or (5) above, and capable of receiving data via the bus 1470 and decrypting the received data with the own device class secret key; module 1402, which verifies the data received via the bus 1470 with the public key issued by the certification authority; module 1440, which generates a challenge key; module 1441, which encrypts the generated challenge key with the device class public key that is transmitted in certificate form from the transfer destination; module 1442, which joins the output from module 1441 to the own certificate including the device class public key; module 1450, which decrypts the data received via the bus 1470 with the challenge key; module 1452, which decrypts the data received via the bus 1470 with the session shell key; module 1451, which decrypts the output from module 1450 with the own device secret key; module 1431, which reads the license recorded in the own license storage 333 and temporarily stores the read license; module 1454, which encrypts the license acquired from module 1431 with the session time-variant key; module 1455, which joins the own certificate invalidation list to the output of module 1454 when a switch 1460 is ON, and encrypts the resulting joined data with the session shell key; module 1461, which encrypts the locally generated session shell key with the device public key transmitted from the transfer destination; and module 1462, which joins the output of module 1455 to the output of module 1461 and transmits the resulting joined data to the bus 1470.

(10) A removable storage including the license transfer manager 321 according to (6) above.

(11) A license decoder including the license transfer manager 321 according to (6) above.

(12) A content manager 101 including the license transfer manager 321 according to (7) above.

(13) A distribution server 150 including the license transfer manager 321 according to (7) above.

(14) A removable storage including the license transfer manager 321 according to (7) above.

(15) A removable storage including the license transfer manager 321 according to (8) above.

(16) A license decoder including the license transfer manager 321 according to (8) above.

(17) A content manager 101 including the license transfer manager 321 according to (9) above.

(18) A distribution server 150 including the license transfer manager 321 according to (9) above.

(19) A removable storage including the license transfer manager 321 according to (9) above.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A computer-implemented method for encrypting and transferring a license that comprises content data, key data for decrypting the content data, and decryption permission condition data for the content data, the computer-implemented method comprising:
   causing a transfer destination comprising a recorder/player to,
      transmit to a transfer source comprising a distribution server, a certificate including a public key of the transfer destination;
   causing the transfer source to,
      verify the validity of the received certificate,
      generate a challenge key,
      encrypt the challenge key with the public key,
      transmit first data to the transfer destination, said first data being formed by joining a certificate including a public key of the transfer source to the resulting encrypted data, and
      transmit second data to the transfer destination, said second data being formed by joining a license ID for identifying the license to key type data used for indicating the type of a license encryption key;
   causing the transfer destination to,
      decrypt said first data excluding the transfer source's public key with a secret key of the transfer destination to acquire the challenge key after acquiring the transfer source's public key from said first data,
      generate a first session key and a second session key or only the first session key in accordance with the key type data,
      generate joined data by joining the first session key to the transfer destination's own public key or joining the first session key to the second session key,
      generate encrypted data by encrypting the joined data with said transfer source's own public key,
      generate further encrypted data by encrypting the encrypted data with said challenge key, and
      transmit the further encrypted data to the transfer source;
   causing the transfer source,
      generate decrypted data by decrypting the further encrypted data with said challenge key,
      generate further decrypted data by decrypting the decrypted data with a secret key of the transfer source,
      acquire the first session key and the second session key or the first session key and the transfer destination's public key from the further decrypted data,
      generate an encrypted license by encrypting the license with the second session key or the transfer destination's public key,
      generate a further encrypted license by encrypting the encrypted license with said first session key, and
      transmit the further encrypted license to the transfer destination; and causing the transfer destination to,
    generate a decrypted license by decrypting the further encrypted license with said first session key,
    acquire the license by generating a further decrypted license by decrypting the decrypted license with said second session key or the transfer source's own public key, and
    store the further decrypted license, and
    access the content data utilizing the further decrypted license.

2. The transfer method according to claim 1, wherein, when said license is to be encrypted and transferred while the first session key common to the transfer source and the transfer destination is retained, the method comprises:
    causing the transfer destination to,
        generate a new session key,
        generating encrypted session data by encrypting the new session key with said first session key, and
        transmit the encrypted session data to the transfer source; and
    causing the transfer source to,
        acquire said new session key by decrypting the encrypted session data with said first session key,
        generate the encrypted license with the acquired new session key,
        generate the further encrypted license with said first session key.

3. A system comprising:
    a transfer destination comprising a recorder/player, the transfer destination configured to,
        transmit to a transfer source comprising a distribution server, a certificate including a public key of the transfer destination;
    the transfer source configured to,
        verify the validity of the received certificate,
        generate a challenge key,
        encrypt the challenge key with the public key,
        transmit first data to the transfer destination, said first data being formed by joining a certificate including a public key of the transfer source to the resulting encrypted data, and
        transmit second data to the transfer destination, said second data being formed by joining a license ID for identifying a license to key type data used for indicating the type of a license encryption key;
    the transfer destination further configured to,
        decrypt said first data excluding the transfer source's public key with a secret key of the transfer destination to acquire the challenge key after acquiring the transfer source's public key from said first data,
        generate a first session key and a second session key or only the first session key in accordance with the key type data,
        generate joined data by joining the first session key to the transfer destination's own public key or joining the first session key to the second session key,
        generate encrypted data by encrypting the joined data with said transfer source's own public key,
        generate further encrypted data by encrypting the encrypted data with said challenge key, and
        transmit the further encrypted data to the transfer source;
    the transfer source further configured to,
        generate decrypted data by decrypting the further encrypted data with said challenge key,
        generate further decrypted data by decrypting the decrypted data with a secret key of the transfer source,
        acquire the first session key and the second session key or the first session key and the transfer destination's public key from the further decrypted data,
        generate an encrypted license by encrypting the license with the second session key or the transfer destination's public key,
        generate a further encrypted license by encrypting the encrypted license with said first session key, and
        transmit the further encrypted license to the transfer destination; and
    the transfer destination further configured to,
        generate a decrypted license by decrypting the further encrypted license with said first session key,
        acquire the license by generating a further decrypted license by decrypting the decrypted license with said second session key or the transfer source's own public key, and
        store the further decrypted license; and
        access the content data utilizing the further decrypted license.

4. The system of claim 3 wherein the content data, the public key of the transfer destination, the first data, the second data, the further encrypted data, and the further encrypted license are transferred between network nodes.

5. The system of claim 3 wherein the content data, the public key of the transfer destination, the first data, the second data, the further encrypted data, and the further encrypted license are transferred between recording media.

6. The system according to claim 3, wherein, when the license is to be encrypted and transferred while the first session key common to the transfer source and the transfer destination is retained,
    the transfer destination is further configured to,
        generate a new session key,
        generate encrypted session data by encrypting the new session key with said first session key, and
        transmit the encrypted session data to the transfer source; and
    the transfer source is configured to,
        acquire said new session key by decrypting the encrypted session data with said first session key,
        generate the encrypted license with the acquired new session key,
        generate the further encrypted license with said first session key.

7. The system of claim 6 wherein the encrypted session data is transferred between network nodes.

8. The system of claim 6 wherein the encrypted session data is transferred between recording media.

9. The method of claim 1 wherein the content data, the public key of the transfer destination, the first data, the second data, the further encrypted data, and the further encrypted license are transferred between recording media.

10. The method of claim 1 wherein the content data, the public key of the transfer destination, the first data, the second data, the further encrypted data, and the further encrypted license are transferred between network nodes.

11. The method of claim 2 wherein the encrypted session data is transferred between network nodes.

12. The method of claim 2 wherein the encrypted session data is transferred between recording media.

* * * * *